(12) United States Patent
Fineis et al.

(10) Patent No.: US 10,474,932 B2
(45) Date of Patent: Nov. 12, 2019

(54) DETECTION OF ANOMALIES IN MULTIVARIATE DATA

(71) Applicant: Uptake Technologies, Inc., Chicago, IL (US)

(72) Inventors: Frank Fineis, Chicago, IL (US); Michael Horrell, Chicago, IL (US); Tuo Li, Chicago, IL (US); James Herzog, Downers Grove, IL (US)

(73) Assignee: Uptake Technologies, Inc., Chicago, IL (US)

( * ) Notice: Subject to any disclaimer, the term of this patent is extended or adjusted under 35 U.S.C. 154(b) by 180 days.

(21) Appl. No.: 15/367,012

(22) Filed: Dec. 1, 2016

(65) Prior Publication Data

US 2018/0060703 A1 Mar. 1, 2018

Related U.S. Application Data

(60) Provisional application No. 62/382,629, filed on Sep. 1, 2016.

(51) Int. Cl.
  *G06K 9/62* (2006.01)
  *G01D 21/00* (2006.01)
  *G06K 9/00* (2006.01)

(52) U.S. Cl.
  CPC .......... *G06K 9/6284* (2013.01); *G01D 21/00* (2013.01); *G06K 9/00* (2013.01)

(58) Field of Classification Search
  CPC .................................................. G06K 9/6284
  See application file for complete search history.

(56) References Cited

U.S. PATENT DOCUMENTS

| 5,566,092 A | 10/1996 | Wang et al. |
| 5,633,800 A | 5/1997 | Bankert et al. |

(Continued)

FOREIGN PATENT DOCUMENTS

| WO | 2011117570 | 9/2011 |
| WO | 2013034420 | 3/2013 |

(Continued)

OTHER PUBLICATIONS

Biswas, "Redundancy-based Approaches in Wireless Multihop Network Design", PhD Dissertation Submitted to Graduate Faculty of North Carolina State University (2014).

(Continued)

*Primary Examiner* — John E Breene
*Assistant Examiner* — Jeffrey C Morgan
(74) *Attorney, Agent, or Firm* — Lee Sullivan Shea & Smith LLP

(57) ABSTRACT

Disclosed herein are systems, devices, and methods for detecting anomalies in multivariate data received from an asset-related data source, such as signal data and/or other data from an asset. According to an example, a platform may receive multivariate data from an asset in an original coordinate space and transform the data in the original coordinate space to a transformed coordinate space having a relatively fewer number of dimensions. Additionally, the platform may standardize the data in the transformed coordinate space and modify the standardized data based on a comparison between the standardized data and a set of threshold values previously defined via training data reflective of normal asset operation. Thereafter, the platform may inversely transform the modified data back to the original coordinate space and perform an analysis to detect anomalies.

20 Claims, 13 Drawing Sheets

(56) References Cited

U.S. PATENT DOCUMENTS

| | | |
|---|---|---|
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B2 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0175039 A1* | 9/2004 | Miller ............... G06K 9/00208 382/181 |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2009/0097772 A1 | 4/2009 | Zhao et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0279948 A1 | 9/2014 | Mahate et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0262060 A1 | 9/2015 | Husain et al. |

FOREIGN PATENT DOCUMENTS

| | | |
|---|---|---|
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

Waltermire et al, Applying the Continuous Monitoring Technical Reference Model to the Asset, Configuration, and Vulnerability Management Domains (DRAFT), NIST (Jan. 2012).

Parra et al. "Statistical Independence and Novelty Detection with Information Preserving Nonlinear Maps." Neural Computation, vol. 8, Iss. 2, Feb. 15, 1996, pp. 260-269.

(56) References Cited

OTHER PUBLICATIONS

Dutta et al. "Distributed Top-K Outlier Detection from Astronomy Catalogs using the DEMAC System." Proceedings of the 2007 SIAM International Conference on Data Mining, 2007, 12 pages.

Ide et al. "Eigenspace-based Anomaly Detection in Computer Systems." KDD-2004 Proceedings of the tenth ACM SIGKDD International Conference on Knowledge Discovery and Data Mining, 2004, pp. 440-449.

Sun et al. "Less is More: Compact Matrix Decomposition for Large Sparse Graphs." Proceedings of the 2007 SIAM International Conference on Data Mining, 2007, 13 pages.

Shyu et al. "A Novel Anomaly Detection Scheme Based on Principal Component Classifier." Miami University Coral Gables FL. Dept. of Electrical and Computer Engineering, 2003, 9 pages.

Fujumaki et al. "An Approach to Spacecraft Anomaly Detection Problem Using Kernel Feature Space." KDD-2005 Proceedings of the Eleventh ACM SIGKDD International Conference on Knowledge Discovery in Data Mining, pp. 401-410.

Yue et al. "Weighted Principal Component Analysis and its Applications to Improve FDC Performance." 43rd IEEE Conference on Decision and Control, Dec. 14-17, 2004, 6 pages.

Noiboar et al "Anomaly Detection in Three Dimensional Data Based on Gauss Markov Random Field Modeling." Israel Institute of Technology, Department of Electrical Engineering, 2004, 4 pages.

International Searching Authority, International Search Report and Written Opinion dated Feb. 22, 2019, issued in connection with International Application No. PCT/US2017/049749, filed on Aug. 31, 2017, 12 pages.

* cited by examiner

DETECTION OF ANOMALIES IN MULTIVARIATE DATA

CROSS REFERENCE TO RELATED APPLICATIONS

This application claims priority to U.S. Provisional Patent Application No. 62/382,629 filed Sep. 1, 2016, entitled "Detection of Anomalies in Multivariate Data," which is herein incorporated by reference in its entirety.

BACKGROUND

Today, machines (also referred to herein as "assets") are ubiquitous in many industries. From locomotives that transfer cargo across countries to farming equipment that harvest crops, assets play an important role in everyday life. Because of the increasing role that assets play, it is also becoming increasingly desirable to monitor and analyze assets in operation. To facilitate this, some have developed mechanisms to monitor asset attributes and detect abnormal conditions at an asset. For instance, one approach for monitoring assets generally involves various sensors and/or actuators distributed throughout an asset that monitor the operating conditions of the asset and provide signals reflecting the asset's operation to an on-asset computer. As one representative example, if the asset is a locomotive, the sensors and/or actuators may monitor parameters such as temperatures, pressures, fluid levels, voltages, and/or speeds, among other examples. If the signals output by one or more of the sensors and/or actuators reach certain values, the on-asset computer may then generate an abnormal condition indicator, such as a "fault code," which is an indication that an abnormal condition has occurred within the asset. The on-asset computer may also be configured to monitor for, detect, and generate data indicating other events that may occur at the asset, such as asset shutdowns, restarts, etc.

The on-asset computer may also be configured to send data reflecting the attributes of the asset, including operating data such as signal data, abnormal-condition indicators, and/or asset event indicators, to a remote location for further analysis.

Overview

An organization that is interested in monitoring and analyzing assets in operation may deploy an asset data platform that is configured to receive and analyze various types of asset-related data. For example, the asset data platform may be configured to receive and analyze data indicating asset attributes, such as asset operating data, asset configuration data, asset location data, etc. As another example, the data-analysis platform may be configured to receive and analyze asset maintenance data, such as data regarding inspections, servicing, and/or repairs. As yet another example, the data-analysis platform may be configured to receive and analyze external data that relates to asset operation, such as weather data, traffic data, or the like. The data-analysis platform may be configured to receive and analyze various other types of asset-related data as well.

The asset data platform may receive this asset-related data from various different sources. As one example, the data-analysis platform may receive asset-related data from the assets themselves. As another example, the asset data platform may receive asset-related data from some other platform or system (e.g., an organization's existing platform) that previously received and/or generated asset-related data. As yet another example, the asset data platform may receive asset-related data from an external data source, such as an asset maintenance data repository, a traffic data provider, and/or a weather data provider for instance. The asset data platform may receive asset-related data from various other sources as well.

In operation, issues may arise at a data source that may lead to anomalies in the data received by the asset data platform. For example, issues may arise at a given asset, such as particular sensors and/or actuators that have failed or are malfunctioning, which may lead to anomalies in the data received from the given asset. In turn, these anomalies may cause undesirable effects at the asset data platform, such as unnecessary alerts and inaccurate predictions. Accordingly, it is generally desirable for the asset data platform to perform anomaly detection on the data that it receives from asset-related data sources.

Certain asset-related data received by the asset data platform may be multivariate in nature. For example, an asset typically includes a set of sensors and/or actuators that each serve to (1) monitor a respective variable (e.g., a parameter) during the asset's operation, such as, engine temperature, fuel levels, R.P.M, etc., and (2) output a time-sequence of signal values for the monitored variable, where each such value corresponds to a point of time at which the value was measured. As such, the asset's signal data may take the form of a time-sequence of multivariate data, where each respective data point in the sequence comprises a set of signal values measured by the asset's sensors and/or actuators at respective point in time. (Additionally, the asset and/or the asset data platform may derive other variables from the asset's signal data, in which case these derived variables may also be included in the multivariate data). In this respect, the set of variables being monitored by the asset may be thought of as different dimensions of an original coordinate space. However, many of these variables may be correlated, which may make it more difficult to detect anomalies in the multivariate data.

Disclosed herein are improved systems, devices, and methods for detecting anomalies in multivariate data received from an asset-related data source, such as signal data and/or other data received from an asset. In accordance with the present disclosure, an asset data platform may be configured to carry out an anomaly detection process that generally involves (1) receiving multivariate data (e.g., data from an asset) in an original coordinate space having a number of dimensions equal to the number of variables included in the data, (2) transforming (or "projecting") the received multivariate data from the original coordinate space to a transformed coordinate space having fewer dimensions than the original coordinate space, (3) standardizing the data in the transformed coordinate space, (4) modifying the standardized data in the transformed coordinate space based on comparison between the standardized data and a set of threshold values, which are defined based on training data that is reflective of normal asset operation, (5) inversely transforming (or projecting) the modified data from the transformed coordinate space to the original coordinate space, and (6) analyzing the post-transformation data in the original coordinate space to identify anomalies. This disclosed anomaly detection process may take various forms and be implemented in various manners.

According to an example implementation, the asset data platform may receive multivariate data, such as signal data and/or other data from an asset, in an original coordinate space having a number of dimensions equal to the number of variables included in the data. This received multivariate data may be referred to herein as "observation data." After receiving the observation data, the asset data platform may optionally pre-process the received observation data before projecting it to the transformed coordinate space, such as by normalizing the data in the original coordinate space.

The asset data platform may then transform the observation data from the original coordinate space to the transformed coordinate space using a technique such as Principal Component Analysis (PCA), which is based on a process of linear transformation that may produce new uncorrelated variables (referred to as principal components (PCs)) from a set of original data having correlated variable values. To accomplish this, the transformation may reduce the dimensions (e.g., corresponding to variables) belonging to an original coordinate space associated with observation data to a fewer number of PCs that are sufficient to represent "hidden" sources of variability in the data. For example, if an observation data point contains a large number of variable values and therefore occupies an original coordinate space with a large number of dimensions, applying PCA to the original observation data may transform that data to a transformed coordinate space containing a reduced number of dimensions, where the transformed observation data comprises a reduced number of variable values that take the form of the PCs described above.

After transforming the observation data to the transformed coordinate space, the asset data platform may standardize the transformed observation data. This standardization may take various forms. According to one example, the standardization may involve z-score standardization that essentially rescales the data such that it adheres to a standard normal distribution (e.g., having the mean equal to 0 and the standard deviation equal to 1). As a consequence of such standardization, the data may be centered around the origin of the transformed coordinate space. The standardization may take other forms as well.

After standardizing the transformed observation data in the transformed coordinate space, the asset data platform may compare the standardized data to a set of threshold values that are defined based on training data that is reflective of normal asset operation. In a preferred embodiment, this set of threshold values may comprise a respective threshold value for each variable in the transformed coordinate space, where each variable's threshold value represents a maximum expected value of the variable during normal asset operation. However, the set of threshold values could take other forms as well. The asset data platform may define this set of threshold values based on the training data in various manners.

In one implementation, the function of defining the set of threshold values for the transformed coordinate space based on training data may involve (1) transforming the training data from the original coordinate space to the transformed coordinate space in a manner similar to that described above (e.g., using PCA), (2) standardizing the transformed training data in the transformed coordinate space in a manner similar to that described above, and (3) for each variable in the transformed coordinate space, using the standard deviation of the standardized training data values to determine a maximum expected value of the variable in the transformed coordinate space. In this respect, the set of threshold values may effectively define the boundary of a multi-dimensional enclosed shape (e.g., a circle, ellipsoid, etc.) centered around the origin of the transformed coordinate space. The set of threshold values may be defined in other manners as well.

The asset data platform may perform the comparison between the standardized observation data and the set of threshold values in various manners. In a preferred example, the asset data platform may compare an observation data point's value for each variable in the transformed coordinate space to the defined threshold value for that variable, to determine whether or not the data point's value exceeds the defined threshold value. However, asset data platform may perform this comparison in other manners as well.

Based on the comparison between the standardized observation data and the set of threshold values, the asset data platform may then modify the standardized observation data in the transformed coordinate space. For instance, if the asset data platform determines based on the comparison that an observation data point comprises at least one variable value in the transformed coordinate space that exceeds the defined threshold value for the variable, the asset data platform may modify the observation data point such that the at least one variable value no longer exceeds the defined threshold value. In other words, the asset data platform may "shrink" one or more of the observation data point's values so that the data point falls within (or at least closer to) the multi-dimensional enclosed shape bounded by the set of threshold values. The asset data platform may carry out this modification in various manners.

In one implementation, the asset data platform may modify an observation data point in the transformed coordinate space on a variable-by-variable basis, by replacing any variable value that exceeds the defined threshold value with the defined threshold value. For example, if a given data point comprises two variable values that exceed defined threshold values in the transformed coordinate space, the asset data platform may replace the value of each such variable with the defined threshold value for that variable, thereby resulting in a reduction in magnitude of those two variable values.

In another implementation, the asset data platform may modify an observation data point in the transformed coordinate space by modifying a plurality of the data point's values in a coordinated manner. For example, if a given data point in the transformed coordinate space is determined to lay outside the multi-dimensional enclosed shape bounded by the set of threshold values in the transformed coordinate space, the asset data platform may modify the given point's set of variable values in a manner such that the data point is moved to the nearest point on the multi-dimensional enclosed shape in the transformed coordinate space. The asset data platform may modify an observation data point in the transformed coordinate space in other manners as well.

After the observation data has been modified in the transformed coordinate space, the asset data platform may be configured to inversely transform the modified observation data from the transformed coordinate space back out to the original coordinate space. In practice, an observed data point that was modified in the transformed coordinate space and then projected back out to the original coordinate space in this manner may have at least one variable value that meaningfully differs from the received observation data in the original coordinate space. In other words, there may be a "gap" between the pre-transformation observation data point and the post-transformation observation point in at least one dimension of the original coordinate space, which may be indicative of an anomaly.

After inversely transforming the modified observation data, the asset data platform may also be configured to post-process such data.

Lastly, the asset data platform may be configured to perform an analysis of the post-transformation observation data in the original coordinate space in order to identify anomalies. For example, the asset data platform may analyze how the post-transformation observation data compares to the pre-transformation observation data in the original coordinate space over some period of time, in order to identify instances when one or more variables in the observation data appear to be anomalous (e.g., instances when statistically-significant discrepancies exist in at least one variable value between the post-transformation and pre-transformation observation data). Based on this analysis, the asset data platform may generate notifications of such anomalies, which may be presented to interested users of the platform. The asset data platform may also perform various other functions based on the data generated by the process described above.

As discussed above, the examples provided herein are related to detecting anomalies in multivariate data received from an asset-related data source, such as signal data and/or other data from an asset. In one aspect, a computing device is provided. The computing device comprises at least a network interface, at least one processor, a non-transitory computer-readable medium, and program instructions stored on the non-transitory computer-readable medium. The program instructions are executable by at least one processor to cause a computing device to: (a) receive, via the network interface from an asset, multivariate data in an original coordinate space having a number of dimensions equal to the number of variables included in the data; (b) transform the received multivariate data from the original coordinate space to a transformed coordinate space having fewer dimensions than the original coordinate space; (c) standardize the data in the transformed coordinate space; (d) modify the standardized data in the transformed coordinate space based on a set of threshold values, wherein the set of threshold values are defined based on training data reflective of normal asset operation; (e) inversely transform the modified data from the transformed coordinate space to the original coordinate space; and (f) analyze the inversely-transformed data in the original coordinate space to identify anomalies. In other aspects a non-transitory computer readable medium and a computer-implemented method are provided which perform the same and/or substantially similar functions as the computing device.

Advantageously, the disclosed process may lead to quicker and/or more accurate detection of anomalies in multivariate data.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
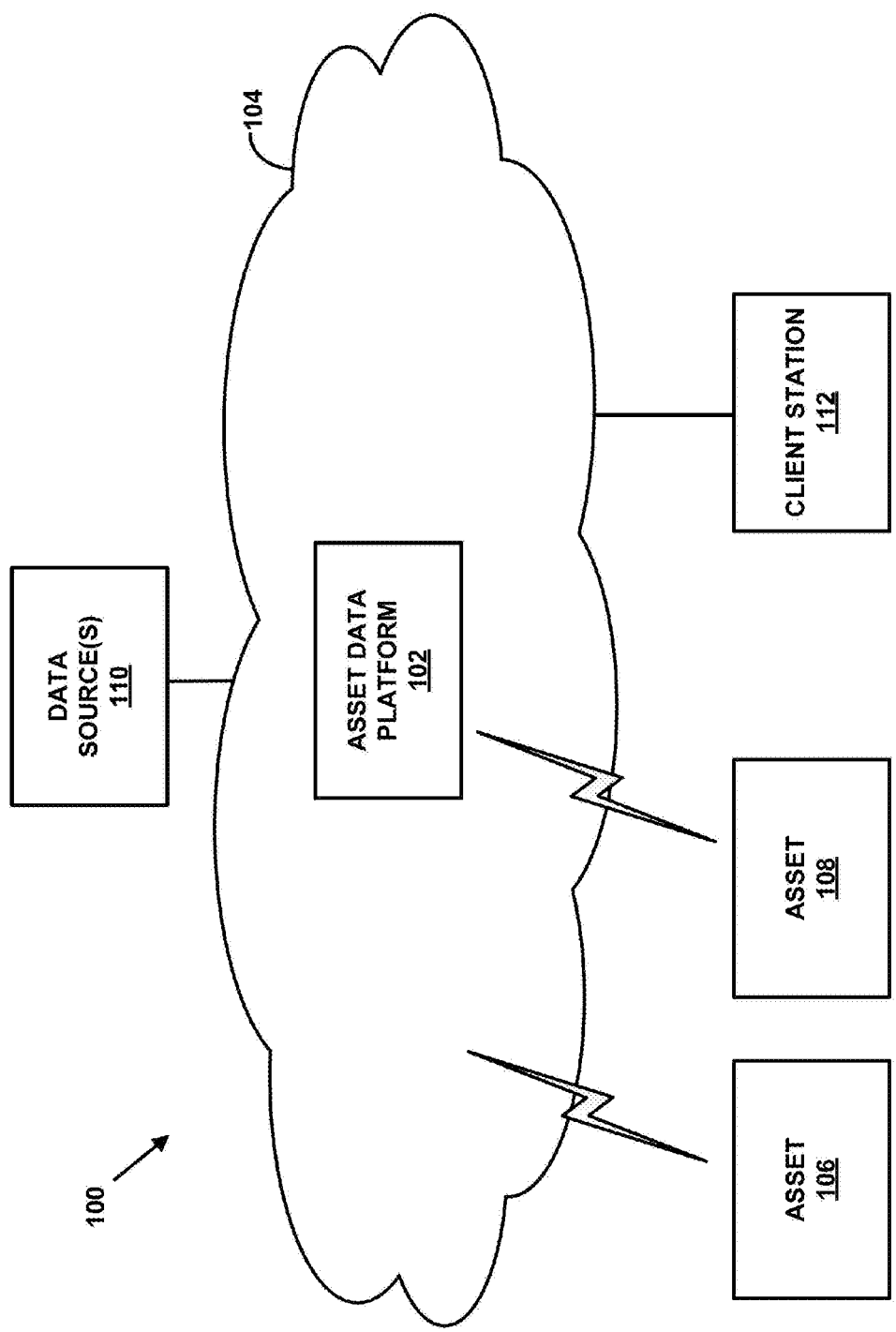
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as an asset data platform, which may communicate via a communication network 104 with one or more assets, such as representative assets 106 and 108, one or more data sources, such as representative data source 110, and one or more output systems, such as representative client station 112. It should be understood that the network configuration may include various other systems as well.

Broadly speaking, the asset data platform 102 (sometimes referred to herein as an "asset condition monitoring system") may take the form of one or more computer systems that are configured to receive, ingest, process, analyze, and/or provide access to asset-related data. For instance, a platform may include one or more servers (or the like) having hardware components and software components that are configured to carry out one or more of the functions disclosed herein for receiving, ingesting, processing, analyzing, and/or providing access to asset-related data. Additionally, a platform may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well. The asset data platform 102 is discussed in further detail below with reference to FIG. 4.

As shown in FIG. 1, the asset data platform 102 may be configured to communicate, via the communication network 104, with the one or more assets, data sources, and/or output systems in the network configuration 100. For example, the asset data platform 102 may receive asset-related data, via the communication network 104, that is sent by one or more assets and/or data sources. As another example, the asset data platform 102 may transmit asset-related data and/or commands, via the communication network 104, for receipt by an output system, such as a client station, a work-order system, a parts-ordering system, etc. The asset data platform 102 may engage in other types of communication via the communication network 104 as well.

In general, the communication network 104 may include one or more computing systems and network infrastructure configured to facilitate transferring data between asset data platform 102 and the one or more assets, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the asset data platform 102 and the one or more assets, data sources, and/or output systems may include one or more intermediate systems. For example, the one or more assets and/or data sources may send asset-related data to one or more intermediary systems, such as an asset gateway or an organization's existing platform (not shown), and the asset data platform 102 may then be configured to receive the asset-related data from the one or more intermediary systems. As another example, the asset data platform 102 may communicate with an output system via one or more intermediary systems, such as a host server (not shown). Many other configurations are also possible.

In general, the assets 106 and 108 may take the form of any device configured to perform one or more operations (which may be defined based on the field) and may also include equipment configured to transmit data indicative of the asset's attributes, such as the operation and/or configuration of the given asset. This data may take various forms, examples of which may include signal data (e.g., sensor/actuator data), fault data (e.g., fault codes), location data for the asset, identifying data for the asset, etc.

Representative examples of asset types may include transportation machines (e.g., locomotives, aircrafts, passenger vehicles, semi-trailer trucks, ships, etc.), industrial machines (e.g., mining equipment, construction equipment, processing equipment, assembly equipment, etc.), medical machines (e.g., medical imaging equipment, surgical equipment, medical monitoring systems, medical laboratory equipment, etc.), utility machines (e.g., turbines, solar farms, etc.), and unmanned aerial vehicles, among other examples. Additionally, the assets of each given type may have various different configurations (e.g., brand, make, model, firmware version, etc.).

As such, in some examples, the assets 106 and 108 may each be of the same type (e.g., a fleet of locomotives or aircrafts, a group of wind turbines, a pool of milling machines, or a set of magnetic resonance imagining (MM) machines, among other examples) and perhaps may have the same configuration (e.g., the same brand, make, model, firmware version, etc.). In other examples, the assets 106 and 108 may have different asset types or different configurations (e.g., different brands, makes, models, and/or firmware versions). For instance, assets 106 and 108 may be different pieces of equipment at a job site (e.g., an excavation site) or a production facility, among numerous other examples. Those of ordinary skill in the art will appreciate that these are but a few examples of assets and that numerous others are possible and contemplated herein.

Depending on an asset's type and/or configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 110 may be or include one or more computing systems configured to collect, store, and/or provide data that is related to the assets or is otherwise relevant to the functions performed by the asset data platform 102. For example, the data source 110 may collect and provide operating data that originates from the assets (e.g., historical operating data, training data, etc.), in which case the data source 110 may serve as an alternative source for such asset operating data. As another example, the data source 110 may be configured to provide data that does not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

In practice, the asset data platform 102 may receive data from the data source 110 by "subscribing" to a service provided by the data source. However, the asset data platform 102 may receive data from the data source 110 in other manners as well.

The client station 112 may take the form of a computing system or device configured to access and enable a user to interact with the asset data platform 102. To facilitate this, the client station may include hardware components such as a user interface, a network interface, a processor, and data storage, among other components. Additionally, the client station may be configured with software components that enable interaction with the asset data platform 102, such as a web browser that is capable of accessing a web application provided by the asset data platform 102 or a native client application associated with the asset data platform 102, among other examples. Representative examples of client stations may include a desktop computer, a laptop, a netbook, a tablet, a smartphone, a personal digital assistant (PDA), or any other such device now known or later developed.

Other examples of output systems may take include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. Example Asset

Figure 2:
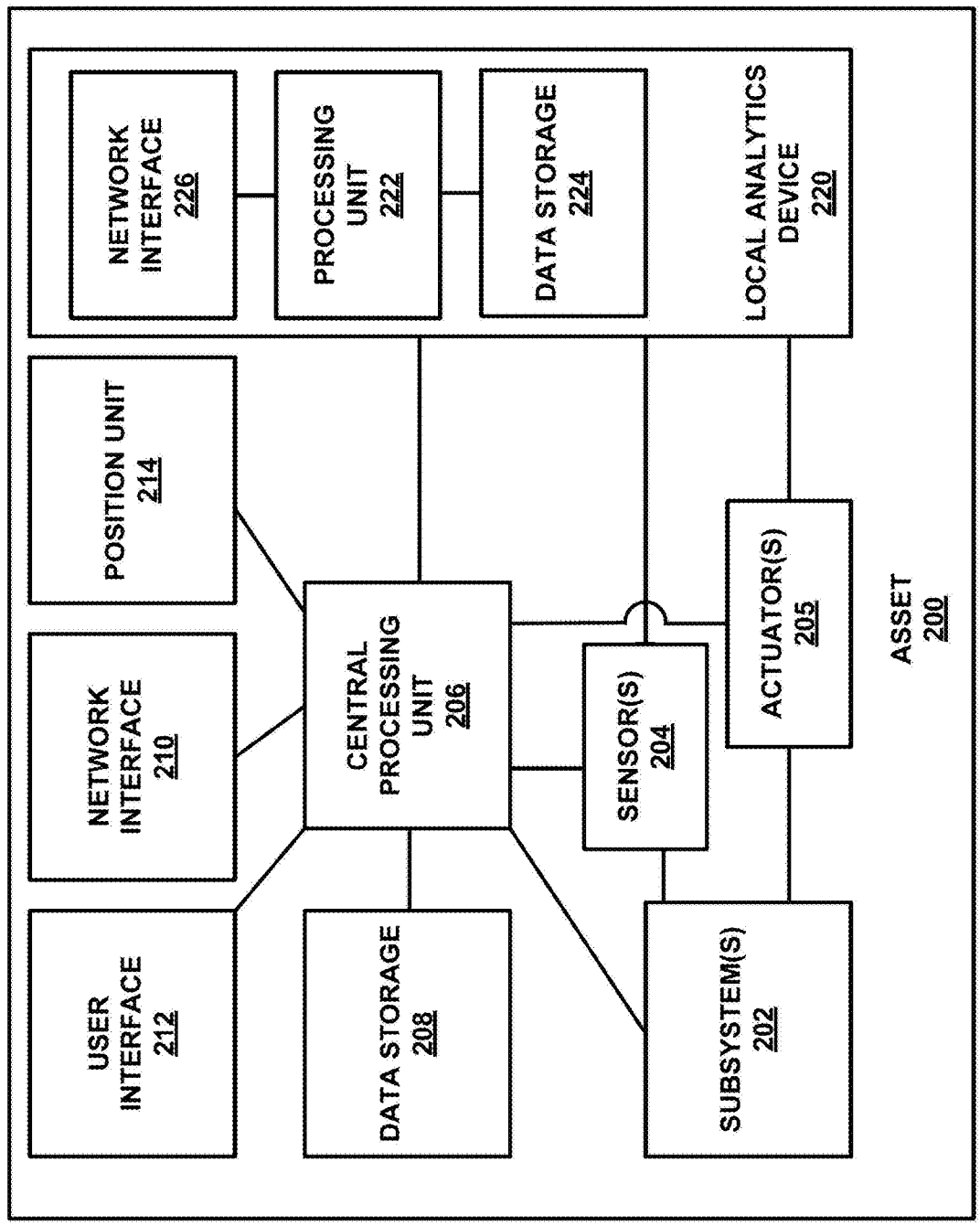
FIG. 2 depicts a simplified block diagram of an example asset.

Turning to FIG. 2, a simplified block diagram of an example asset 200 is depicted. Either or both of assets 106 and 108 from FIG. 1 may be configured like the asset 200. As shown, the asset 200 may include one or more subsystems 202, one or more sensors 204, one or more actuators 205, a central processing unit 206, data storage 208, a network interface 210, a user interface 212, a position unit 214, and perhaps also a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like. In example embodiments, one or more such sensors may be integrated with or located separate from the position unit 214, discussed below.

Additionally, various sensors 204 may be configured to measure other operating conditions of the asset 200, examples of which may include temperatures, pressures, speeds, acceleration or deceleration rates, friction, power usages, throttle positions, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208. Additionally, the central processing unit 206 may be configured to access and/or generate data reflecting the configuration of the asset (e.g., model number, asset age, software versions installed, etc.).

The central processing unit 206 may also be configured to determine whether received sensor and/or actuator signals trigger any abnormal-condition indicators such as fault codes, which is a form of fault data. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the asset data platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the asset data platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
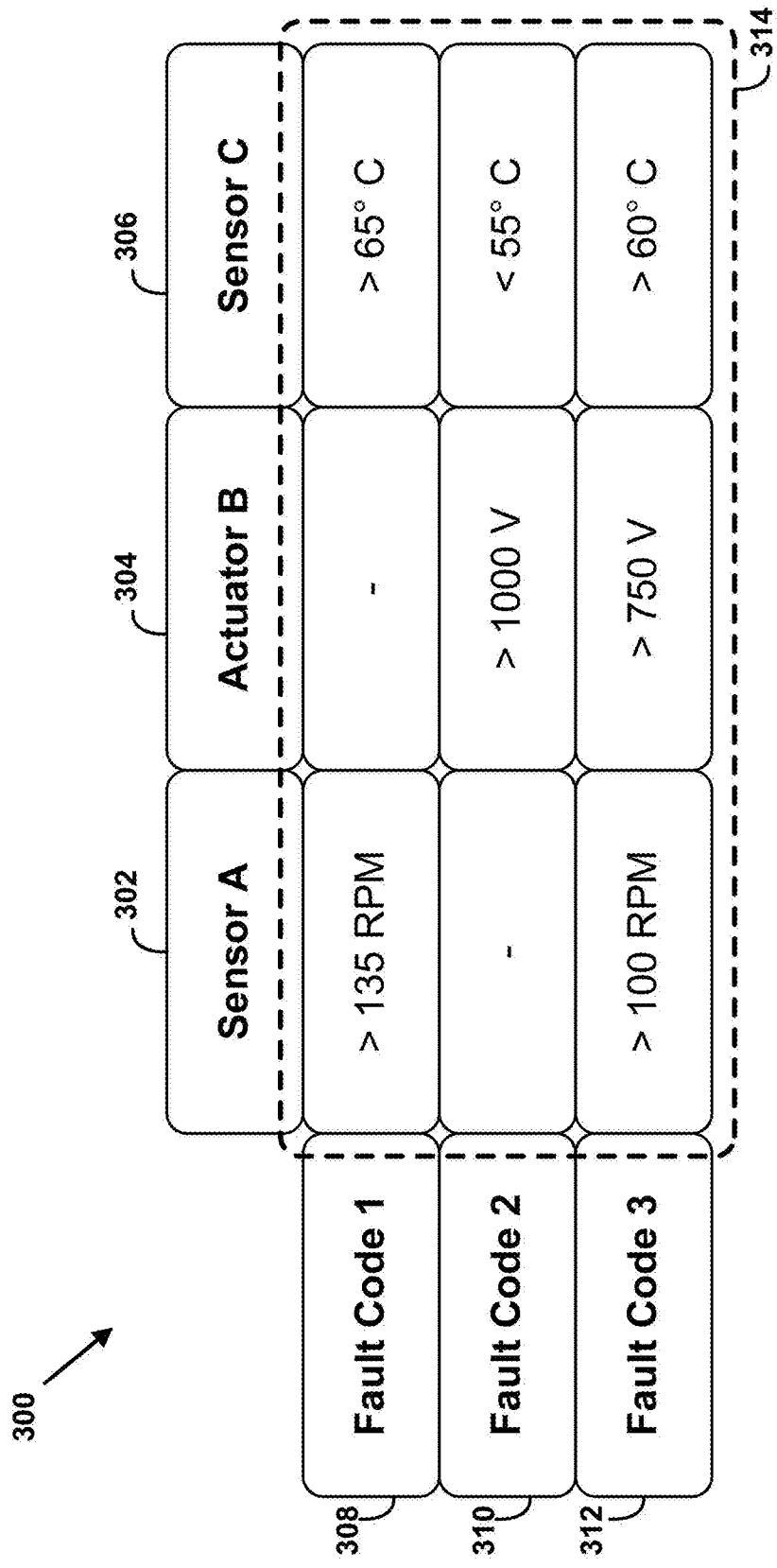
FIG. 3 depicts a conceptual illustration of example abnormal-condition indicators and sensor criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, the user interfaces 212, and/or the position unit 214 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The position unit 214 may be generally configured to facilitate performing functions related to geo-spatial location/position and/or navigation. More specifically, the position unit 214 may be configured to facilitate determining the location/position of the asset 200 and/or tracking the asset 200's movements via one or more positioning technologies, such as a GNSS technology (e.g., GPS, GLONASS, Galileo, BeiDou, or the like), triangulation technology, and the like. As such, the position unit 214 may include one or more sensors and/or receivers that are configured according to one or more particular positioning technologies.

In example embodiments, the position unit 214 may allow the asset 200 to provide to other systems and/or devices (e.g., the asset data platform 102) position data that indicates the position of the asset 200, which may take the form of GPS coordinates, among other forms. In some implementations, the asset 200 may provide to other systems position data continuously, periodically, based on triggers, or in some other manner. Moreover, the asset 200 may provide position data independent of or along with other asset-related data (e.g., along with operating data).

The local analytics device 220 may generally be configured to receive and analyze data related to the asset 200 and based on such analysis, may cause one or more operations to occur at the asset 200. For instance, the local analytics device 220 may receive operating data for the asset 200 (e.g., signal data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that is generated by sensors 204 and/or actuators 205 and sent to the central processing unit 206, or position data generated by the position unit 214) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as the asset data platform 102 or the output system 112, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be the same or similar to the network interfaces described above. In practice, the network interface 226 may facilitate communication between the local analytics device 220 and the asset data platform 102.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. Example Platform

Figure 4:
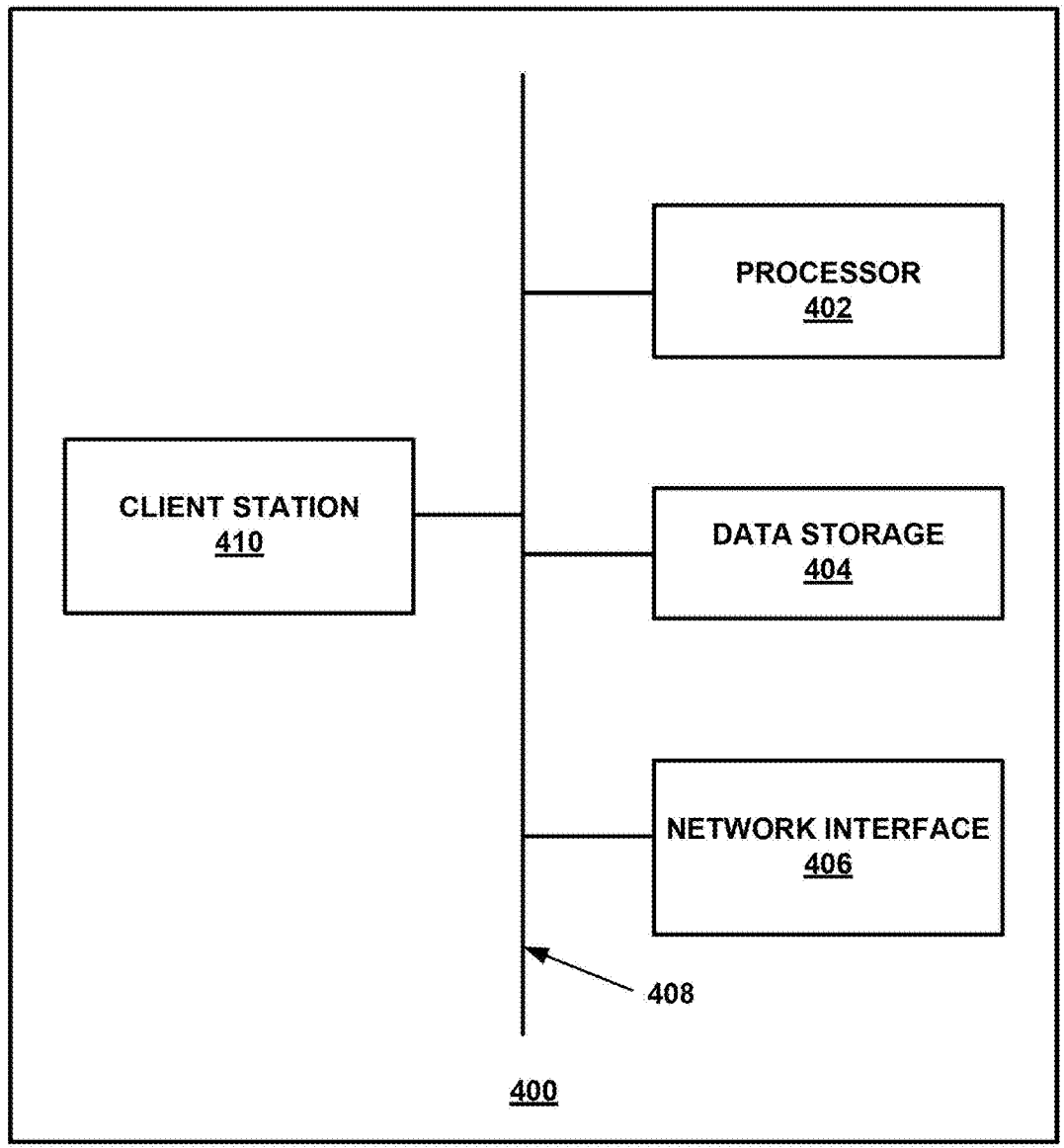
FIG. 4 depicts a structural diagram of an example platform.

FIG. 4 is a simplified block diagram illustrating some components that may be included in an example data asset platform 400 from a structural perspective. In line with the discussion above, the data asset platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown in FIG. 4, the data storage 404 may be provisioned with software components that enable the platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the platform 400 and various network components via the communication network 104, such as assets 106 and 108, data source 110, and client station 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include Hadoop, FTP, relational databases, high frequency data such as OSI PI, batch data such as XML, and Base64. Other configurations are possible as well.

The example data asset platform 400 may also support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
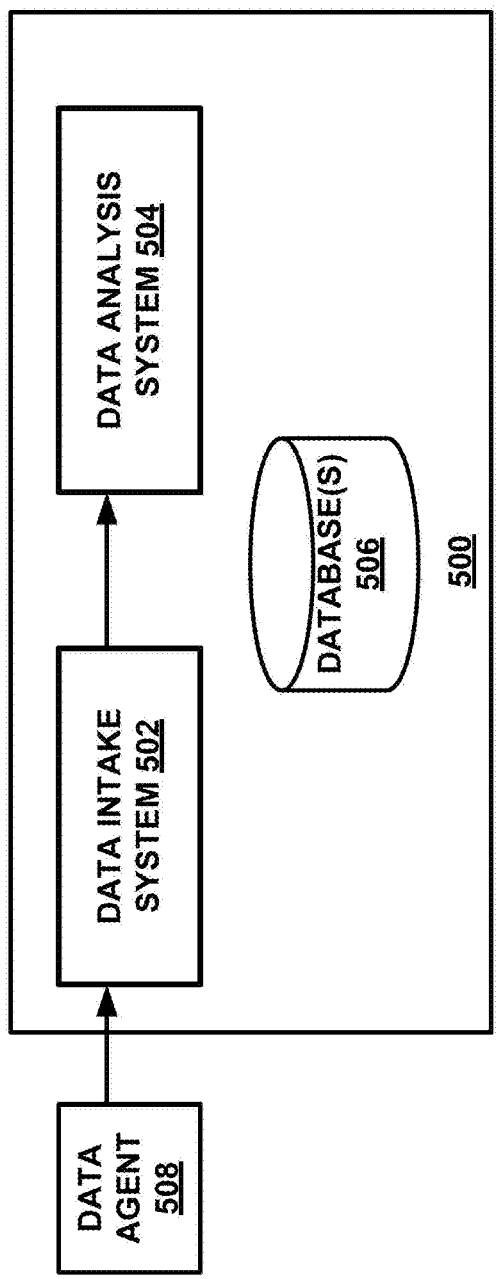
FIG. 5 is a functional block diagram of an example platform.

Referring now to FIG. 5, another simplified block diagram is provided to illustrate some components that may be included in an example platform 500 from a functional perspective. For instance, as shown, the example platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive asset-related data and then provide at least a portion of the received data to the data analysis system 504. As such, the data intake system 502 may be configured to receive asset-related data from various sources, examples of which may include an asset, an asset-related data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an organization's existing platform/system, an external asset-related data source, etc.), that source may be provisioned with a data agent 508. In general, the data agent 508 may be a software component that functions to access asset-related data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting asset-related data to the example platform 500 without the assistance of a data agent.

The asset-related data received by the data intake system 502 may take various forms. As one example, the asset-related data may include data related to the attributes of an asset in operation, which may originate from the asset itself or from an external source. This asset attribute data may include asset operating data such as signal data (e.g., sensor and/or actuator data), fault data, asset location data, weather data, hotbox data, etc. In addition, the asset attribute data may also include asset configuration data, such as data indicating the asset's brand, make, model, age, software version, etc. As another example, the asset-related data may include certain attributes regarding the origin of the asset-related data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. These attributes may come in the form of signal signatures or metadata, among other examples. The asset-related data received by the data intake system 502 may take other forms as well.

The data intake system 502 may also be configured to perform various pre-processing functions on the asset-related data, in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping certain any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received asset-related data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received asset-related data in a first type of database (e.g., a time-series or document database) and may store the associated metadata of received asset-related data in a second type of database that permit more rapid searching (e.g., a relational database). In such an example, the metadata may then be linked or associated to the asset-related data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into three general categories: (1) signal data, (2) event data, and (3) asset configuration data. The signal data may generally take the form of raw, aggregated, or derived data representing the measurements taken by the sensors and/or actuators at the assets. The event data may generally take the form of data identifying events that relate to asset operation, such as faults and/or other asset events that correspond to indicators received from an asset (e.g., fault codes, etc.), inspection events, maintenance events, repair events, fluid events, weather events, or the like. And asset configuration information may then include information regarding the configuration of the asset, such as asset identifiers (e.g., serial number, model number, model year, etc.), software versions installed, etc. The data provided to the data analysis system 504 may also include other data and take other forms as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing asset-related data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. Example Operations

The operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

The following description may reference examples where a single data source, such as the asset 106, provides data to the asset data platform 102 that then performs one or more functions. It should be understood that this is done merely for sake of clarity and explanation and is not meant to be limiting. In practice, the asset data platform 102 generally receives data from multiple sources, perhaps simultaneously, and performs operations based on such aggregate received data.

A. Collection of Operating Data

As mentioned above, each of the representative assets 106 and 108 may take various forms and may be configured to perform a number of operations. In a non-limiting example, the asset 106 may take the form of a locomotive that is operable to transfer cargo across the United States. While in transit, the sensors and/or actuators of the asset 106 may obtain data that reflects one or more operating conditions of the asset 106. The sensors and/or actuators may transmit the data to a processing unit of the asset 106.

The processing unit may be configured to receive the data from the sensors and/or actuators. In practice, the processing unit may receive signal data from multiple sensors and/or multiple actuators simultaneously or sequentially. As discussed above, while receiving this data, the processing unit may be configured to determine whether the data satisfies triggering criteria that trigger any abnormal-condition indicators, otherwise referred to as a fault, such as fault codes, which is fault data that serves as an indication that an abnormal condition has occurred within the asset. In the event the processing unit determines that one or more abnormal-condition indicators are triggered, the processing unit may be configured to perform one or more local operations, such as outputting an indication of the triggered indicator via a user interface. The processing unit may also be configured to derive other data from the signal data received from the sensors and/or actuators (e.g. aggregations of such data) and this derived data may be included with the signal data.

The asset 106 may then transmit asset attribute data—such as asset operating data and/or asset configuration data—to the asset data platform 102 via a network interface of the asset 106 and the communication network 104. In operation, the asset 106 may transmit asset attribute data to the asset data platform 102 continuously, periodically, and/or in response to triggering events (e.g., abnormal conditions). Specifically, the asset 106 may transmit asset attribute data periodically based on a particular frequency (e.g., daily, hourly, every fifteen minutes, once per minute, once per second, etc.), or the asset 106 may be configured to transmit a continuous, real-time feed of operating data. Additionally or alternatively, the asset 106 may be configured to transmit asset attribute data based on certain triggers, such as when sensor and/or actuator measurements satisfy triggering criteria for any abnormal-condition indicators. The asset 106 may transmit asset attribute data in other manners as well.

In practice, asset operating data for the asset 106 may include signal data (e.g., sensor and/or actuator data), fault data, and/or other asset event data (e.g., data indicating asset shutdowns, restarts, diagnostic operations, fluid inspections, repairs etc.). In some implementations, the asset 106 may be configured to provide the data in a single data stream, while in other implementations the asset 106 may be configured to provide the operating data in multiple, distinct data streams. For example, the asset 106 may provide to the asset data platform 102 a first data stream of signal data and a second data stream of fault data. As another example, the asset 106 may provide to the asset data platform 102 a separate data stream for each respective sensor and/or actuator on the asset 106. Other possibilities also exist.

Signal data may take various forms. For example, at times, sensor data (or actuator data) may include measurements obtained by each of the sensors (or actuators) of the asset 106. While at other times, sensor data (or actuator data) may include measurements obtained by a subset of the sensors (or actuators) of the asset 106.

Specifically, the signal data may include measurements obtained by the sensors and/or actuators associated with a given triggered abnormal-condition indicator. For example, if a triggered fault code is Fault Code 1 from FIG. 3, then sensor data may include raw measurements obtained by Sensors A and C. Additionally or alternatively, the data may include measurements obtained by one or more sensors or actuators not directly associated with the triggered fault code. Continuing off the last example, the data may additionally include measurements obtained by Actuator B and/or other sensors or actuators. In some examples, the asset 106 may include particular sensor data in the operating data based on a fault-code rule or instruction provided by the analytics system 108, which may have, for example, determined that there is a correlation between that which Actuator B is measuring and that which caused the Fault Code 1 to be triggered in the first place. Other examples are also possible.

Further still, the data may include one or more sensor and/or actuator measurements from each sensor and/or actuator of interest based on a particular time of interest, which may be selected based on a number of factors. In some examples, the particular time of interest may be based on a sampling rate. In other examples, the particular time of interest may be based on the time at which a fault is detected.

In particular, based on the time at which a fault is detected, the data may include one or more respective sensor and/or actuator measurements from each sensor and/or actuator of interest (e.g., sensors and/or actuators directly and indirectly associated with the detected fault). The one or more measurements may be based on a particular number of measurements or particular duration of time around the time of the detected fault.

For example, if the asset detects a fault that triggers Fault Code 2 from FIG. 3, the sensors and actuators of interest might include Actuator B and Sensor C. The one or more measurements may include the respective set measurements obtained by Actuator B and Sensor C at the time the fault was detected, shortly before the time of the fault detection, shortly after the time of the fault detection, and/or some combination thereof.

Similar to signal data, the fault data may take various forms. In general, the fault data may include or take the form of an indicator that is operable to uniquely identify the particular type of fault that occurred at the asset 106 from all other types of faults that may occur at the asset 106. This indicator, which may be referred to as a fault code, may take the form of an alphabetic, numeric, or alphanumeric identifier, or may take the form of a string of words that is descriptive of the fault type, such as "Overheated Engine" or "Out of Fuel," among other examples. Additionally, the fault data may include other information regarding the fault occurrence, including indications of when the fault occurred (e.g., a timestamp) and where the fault occurred (e.g., GPS data), among other examples. Data relating to other types of events (e.g., maintenance events) may take a similar form.

Moreover, the asset configuration data may take a variety of forms as well. Generally, the asset configuration data pertains to information "about" an asset. In one instance, asset configuration data may include asset identification information, such as model number, model year (e.g., asset age), etc. Whereas, in another instance, the asset configuration data may directly relate to a particular past and/or present configuration of the asset. For example, the asset configuration data may indicate which software versions are installed and/or running on the asset, after market modifications made to an asset, among other possibilities.

The asset data platform 102, and in particular, the data intake system of the asset data platform 102, may be configured to receive asset attribute data from one or more assets and/or data sources. The data intake system may be configured to intake at least a portion of the received data, perform one or more operations to the received data, and then relay the data to the data analysis system of the asset data platform 102. In turn, the data analysis system may analyze the received data and based on such analysis, perform one or more operations.

B. Detection of Anomalies in Multivariate Asset Data

As mentioned above, the asset data platform 102 may be configured to carry out an anomaly detection process that generally involves (1) receiving multivariate data (e.g., signal data and/or other data from an asset), herein referred to as "observation data," in an original coordinate space having a number of dimensions equal to the number of the variables in the data, (2) transforming (or "projecting") the received multivariate data from the original coordinate space to a transformed coordinate space having fewer dimensions than the original coordinate space, (3) standardizing the data in the transformed coordinate space, (4) modifying the standardized data in the transformed coordinate space based on a comparison between the standardized data and a set of threshold values, which are defined based on training data that is reflective of normal asset operation, (5) inversely transforming (or projecting) the modified data from the transformed coordinate space to the original coordinate space, and (6) analyzing the post-transformation data in the original coordinate space to identify anomalies.

In example implementations, the above described process for facilitating the detection of anomalies in received multivariate data may depend upon a set of threshold values being defined based on training data. In this respect, the asset data platform may be configured to execute a training phase, which may output the defined set of threshold values. The output threshold values from the training phase may then be utilized in the process for detecting anomalies in received multivariate data.

Figure 6:
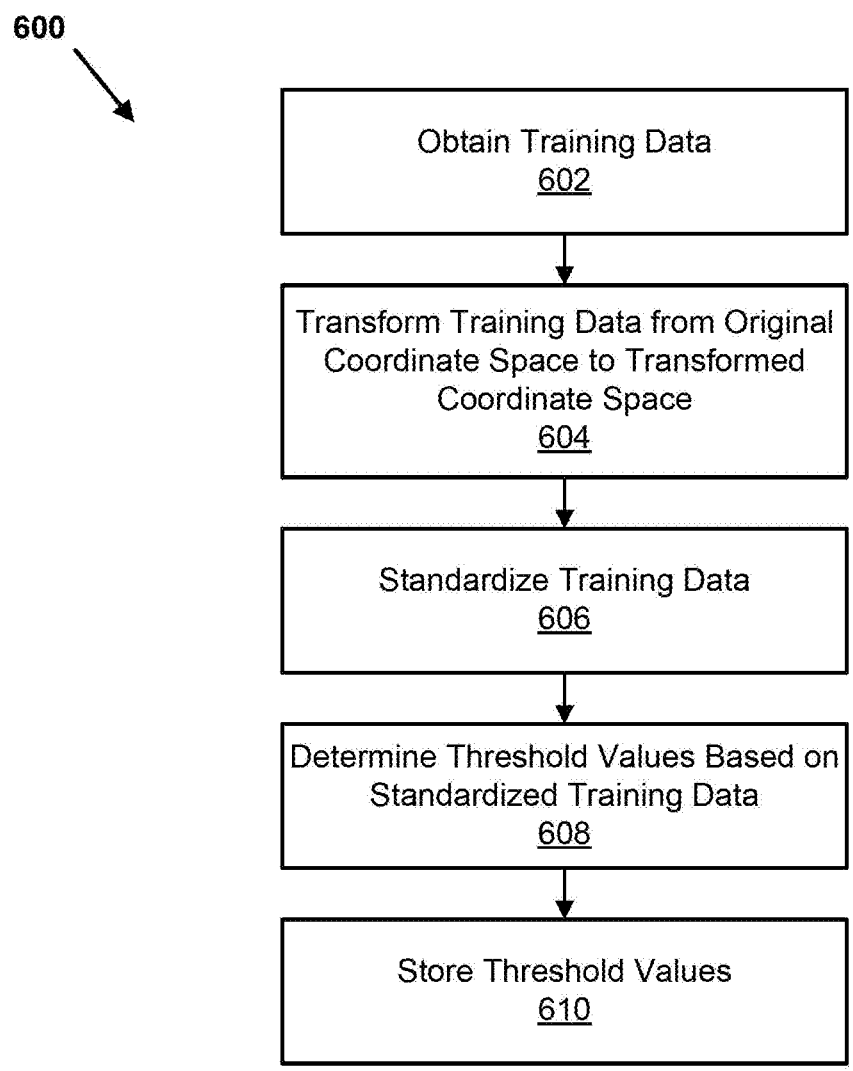
FIG. 6 is an example flow diagram that depicts defining a set of threshold values for the transformed coordinate space.

Turning now to FIG. 6, an example flow diagram is provided that depicts one possible example method 600 for using training data that is reflective of normal asset operation to define a set of threshold values for the transformed coordinate space. In general, the set of threshold values defined via method 600 may be utilized by the asset data platform 102 in the performance of example method 1100, to be described in further detail below, to modify values corresponding to multivariate data received by asset data platform 102 from assets. For the purposes of illustration, the example method 600 is described as being carried out by asset data platform 102, but this example method may be carried out by other devices/or systems. One of ordinary skill in the art will also appreciate that flow diagram 600 is provided for sake of clarity and explanation and that numerous other combinations of operations may be utilized to facilitate identification of anomalies in multivariate data.

At block 602, the asset data platform 102 may obtain training data that is reflective of normal asset operation (e.g., does not contain anomalies). For instance, the training data may take the form of historical time-series, multivariate data related to the operation of assets, which may be received from asset-related data sources (e.g., assets in the field) and/or generated by the asset data platform 102. In practice, the asset data platform 102 may select a set of the stored historical data (e.g., based on the asset type and/or asset the historical data originated from) and determine a given set of training data by performing an analysis of the distribution of the data points included in the selected set. In this respect, the asset data platform 102 may analyze the set of historical data on a variable-by-variable basis to identify a range of data values that reflect normal asset operation. The training data may be obtained in various other manners.

Figure 7:
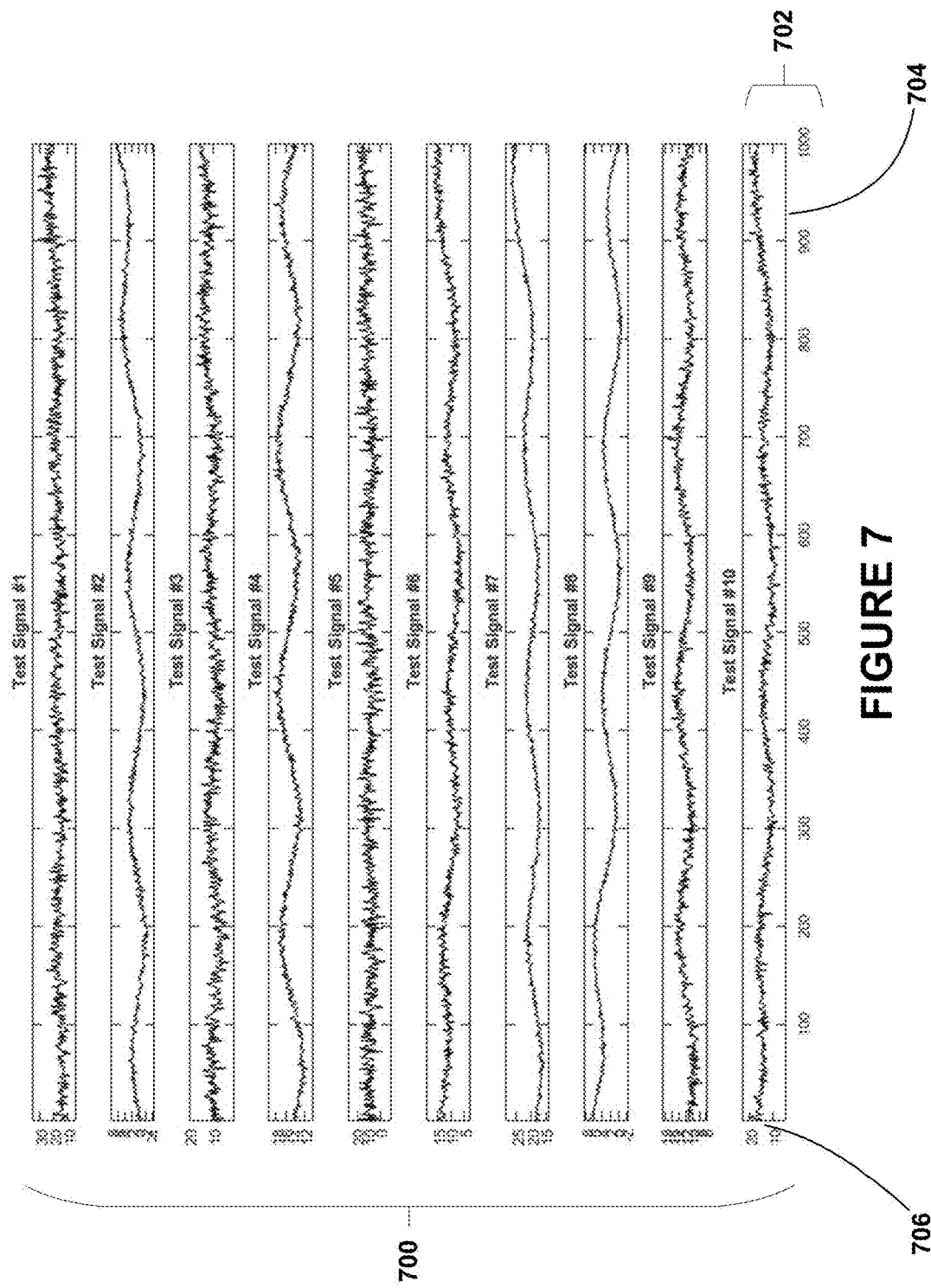
FIG. 7 depicts a conceptual illustration of training data obtained by the example platform.

FIG. 7 is a set of plots 700 that show a representative example of time-series, multivariate training data that may be used by the asset data platform 102. As shown, the set of plots 700 depict a set of variable plots, such as representative variable plot 702, each having the number of measured values within the time-series on a horizontal axis (i.e., 704) and the magnitude of each measured value on a vertical axis (i.e., 706). In one representative example, time-series, multivariate training data received by the asset data platform 102 may be thought of as a set of plots, each corresponding to an output of a respective sensor/actuator at a given asset. For instance, each training variable may be viewed on a plot abscissa that represents time-series measurements of the variable by showing the sequence number of each measured value within the time sequence on a horizontal axis and the magnitude of each measured value on a vertical axis. In this sense, the training data may also be represented as a matrix of measured values having a plurality of rows, each corresponding to a particular point of time, and a plurality of columns, each corresponding to a different variable. In line with the discussion above, each row in such a matrix may then be viewed as a respective data point (i.e., a respective set of signal value measurements) in an original coordinate space having a dimension for each column in the matrix (i.e., each variable in the multivariate training data)

After obtaining the training data, at block 602, the asset data platform 102 may perform pre-processing functions on the training data in a manner similar to that described in further detail below with reference to block 1102 of FIG. 11 (e.g., data imputation).

At block 604, the asset data platform 102 may transform the training data from an original coordinate space to a transformed coordinate space having fewer dimensions than the original coordinate space. The asset data platform 102 may perform this transformation in various manners.

According to one example, the asset data platform 102 may transform the training data from the original coordinate space to the transformed coordinate space using Principal Component Analysis (PCA). Generally, PCA is based on a process of linear transformation that may produce new uncorrelated variables (referred to as principal components (PCs)) from the set of original data having correlated variable values.) In other words, PCA removes the covariance of the multivariable data in the original coordinate space by transforming the data to a set of PCs that have no covariance, where the variance in the PCs "explains" the variance and covariance in the original coordinate space.

To accomplish this, the linear transformation may effectively reduce the dimensions (e.g., corresponding to variables) belonging to the to the original coordinate space associated with the training data to a fewer number of PCs that are sufficient to represent the "hidden" sources of variability in the data. For example, if a training data point contains a large number of dimensions, applying PCA to the original training data may transform that data to a transformed coordinate space containing a reduced number of dimensions, where the transformed training data comprises a reduced number of variable values that take the form of the PCs described above.

For instance, as mentioned above, representative training data may be thought of a time-sequence of multivariate data points represented an original coordinate space having a respective dimension for each variable. In example implementations, the application of PCA to the training data points represented in the original coordinate space may result in the transformed coordinate space having a relatively fewer number of dimensions than the original coordinate space, with each such dimension corresponding to a respective PC.

In practice, the mathematical transformation employed by the asset data platform 102 in applying PCA may be defined in a manner in which a first PCA dimension represents the largest amount of variance in the training data, with each successive PCA dimension being orthogonal to the first PCA dimension and explaining a relatively lower amount of variance. Due to the fact that each successive PCA dimension explains a diminishing amount of variance, the asset data platform 102, via PCA, may be able to focus on a limited number of the determined PCs each corresponding to a PCA dimension to sufficiently assess the variance in the training data that are due to non-random effects. In this respect, the number of PCA dimensions selected by the asset data platform 102 for a given set of training data may be determined by the asset data platform 102 automatically, based on user settings and/or preferences, and/or in some other manner.

As a consequence of the reduced dimensionality of the original coordinate space relative to the transformed coordinate space, the transformed training data points may each contain fewer variable values relative to the training data points in the original coordinate space (e.g., fewer columns in the matrix).

In the example described above, the asset data platform 102 may transform the training data from the original coordinate space to the transformed coordinate space using any variant related to PCA now known or later developed, including kernel PCA, robust PCA, and sparse PCA. In another examples, the asset data platform 102 may transform the training data from the original coordinate space to the transformed coordinate space using a coordinate transformation technique known as partial least squares and its variants, including partial least squares discriminant analysis, partial least squares path modeling, and orthogonal projections to latent structures. The asset data platform 102 may transform the training data from the original coordinate space to the transformed coordinate space using other techniques as well.

Figure 8:
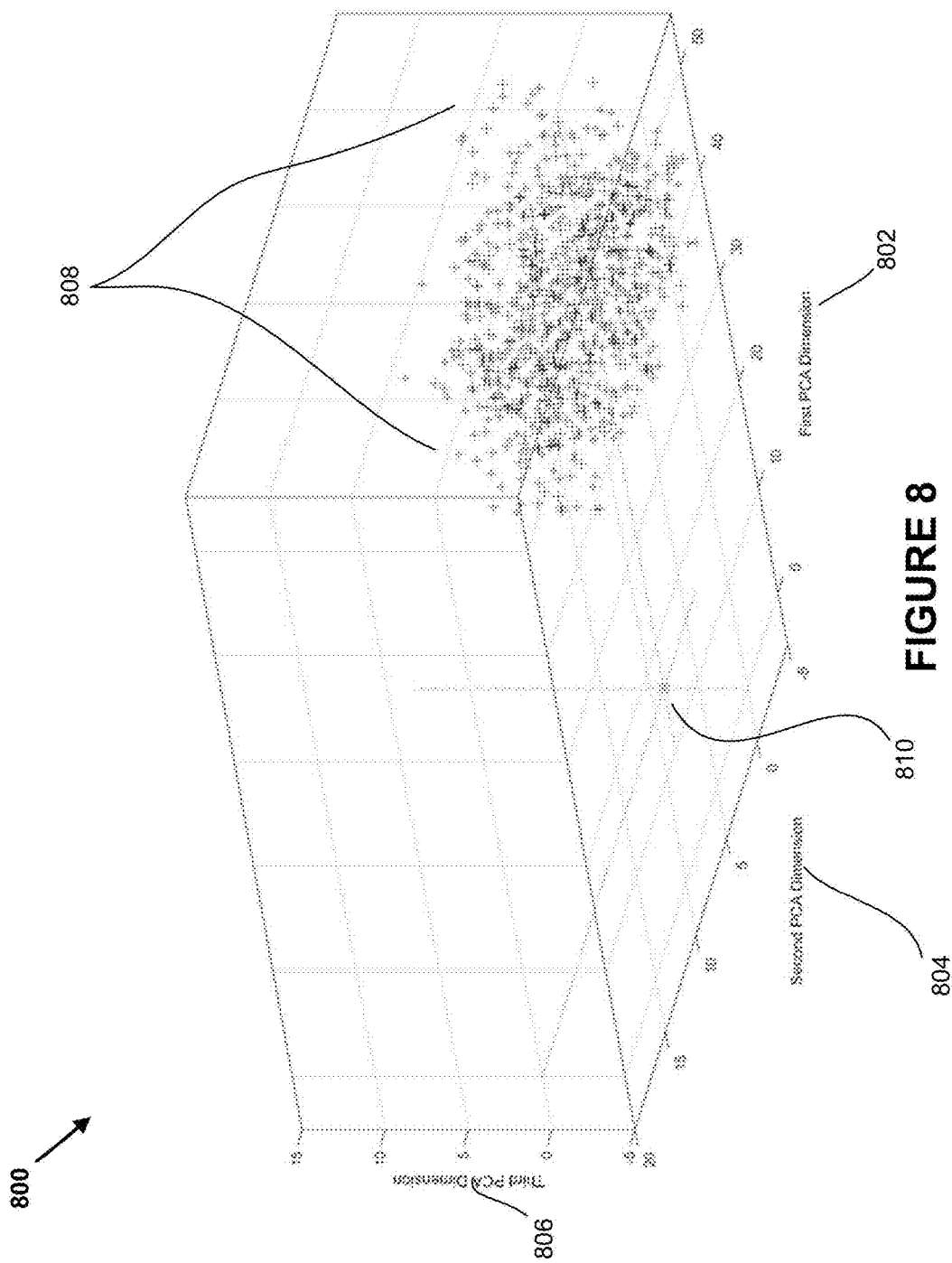
FIG. 8 depicts a conceptual illustration of obtained training data being transformed to a transformed coordinate space.

FIG. 8 shows a conceptual illustration of the obtained training data of FIG. 7 being transformed to a transformed coordinate space. As shown, FIG. 8 depicts transformed coordinate space 800 having transformed training data points 808 plotted with respect to three PCA dimensions (e.g., 802, 804, 806) and the origin 810.

Figure 9:
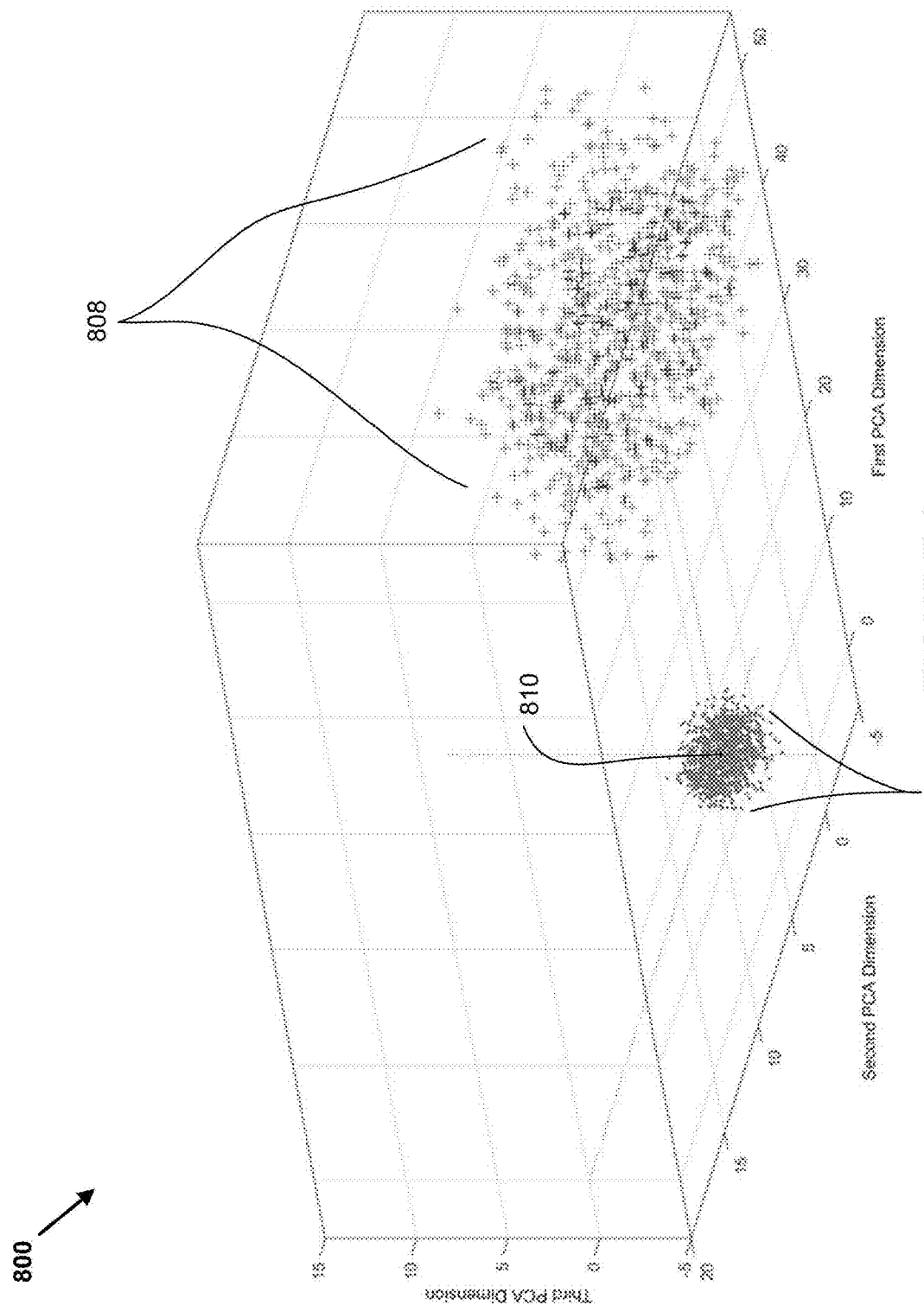
FIG. 9 depicts a conceptual illustration transformed training data being standardized in the transformed coordinate space.

At block 606, the asset data platform 102 may standardize the transformed training data in the transformed coordinate space. FIG. 9 depicts a conceptual illustration of the transformed training data of FIG. 8 being standardized in the transformed coordinate space. Generally, the process of standardization is used to describe the mathematical process by which the mean of a data set is subtracted from each value of the set to center the data, and the difference is divided by the standard deviation of the data to rescale the data. This type of standardization is known as z-score standardization. Other statistical properties can also be used to standardize the transformed data, such as subtracting the median or mode of each PCA dimension to center the data, or dividing by the range or $95^{th}$ percentile of each PCA dimension to rescale the data. As a consequence of such standardization, the variable values for each transformed training data point may be updated such that the transformed training data points are centered around the origin of the transformed coordinate space.

As shown, FIG. 9 depicts the standardized transformed training data 902 in transformed coordinate space 800 being centered around origin 810.

At block 608, for each variable in the transformed coordinate space, the asset data platform 102 may analyze the distribution of standardized training data values for that variable to determine a maximum expected value of the variable in the transformed coordinate space (e.g., based on the standard deviation of the standardized training data values for that variable). In this respect, the set of threshold values may effectively define the boundary of a multi-dimensional enclosed shape (e.g., a circle, ellipsoid, etc.) centered around the origin of the transformed coordinate space.

Figure 10:
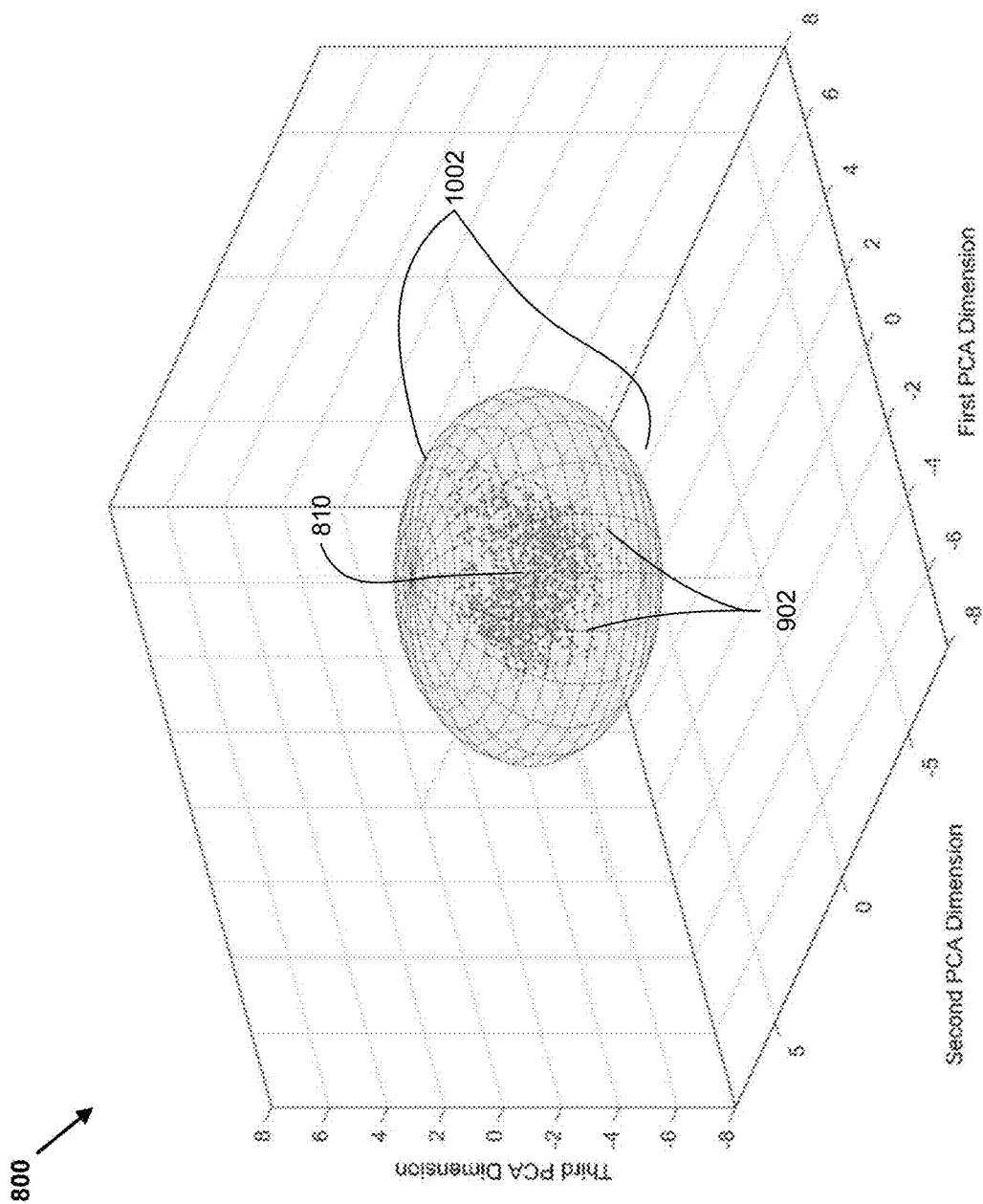
FIG. 10 depicts a conceptual illustration of a set of threshold values in the transformed coordinate space.

FIG. 10 depicts a conceptual illustration of a set of threshold values that have been defined based on the standardized transformed training data 902 of FIG. 9. As shown, the set of threshold values is represented as ellipsoid 1002, which effectively define a boundary centered around the origin 810 of the transformed coordinate space.

Turning back to FIG. 6, at block 610, the asset data platform 102 may store the set of threshold values for future comparison to observation data in the transformed coordinate space.

In embodiments where the asset data platform 102 is configured to modify observation data in the original coordinate space as part of pre-processing, the asset data platform 102 may also be configured to define threshold values for variables in the original coordinate space based on the training data obtained at block 602. For instance, in one implementation, the asset data platform 102 may analyze the distribution of the training data values corresponding to each variable in original coordinate space and then determine minimum and/or maximum expected values (e.g., threshold values) for each such variable. This determination may be based on various metrics related to the distribution of the training data values, examples of which may include the standard deviation and the mean among other possibilities. The asset data platform 102 may define threshold values for the variables in the original coordinate space in other manners as well.

Figure 11:
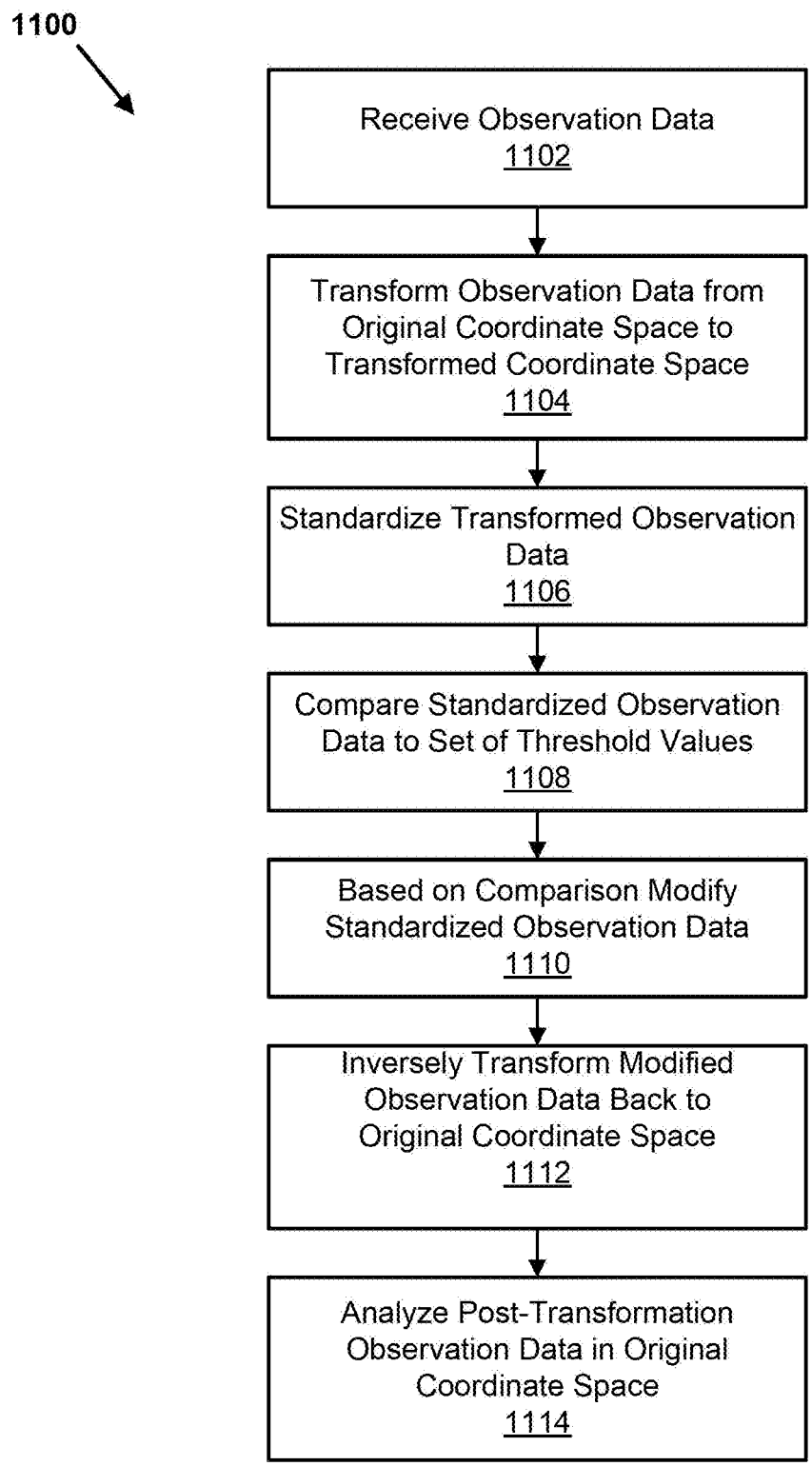
FIG. 11 is an example flow diagram that depicts detecting anomalies in received asset observation data.

FIG. 11 is an example flow diagram that depicts one possible example method 1100 for detecting anomalies in multivariate data received from asset-related data source(s). For the purposes of illustration, the example method 1100 is described as being carried out by asset data platform 102, but this example method may be carried out by other devices/or systems. One of ordinary skill in the art will also appreciate that flow diagram 1100 is provided for sake of clarity and explanation and that numerous other combinations of operations may be utilized to facilitate identification of anomalies in multivariate asset-related data.

At block 1102, the asset data platform 102 may receive multivariate data from an asset-related data source in an original coordinate space having a number of dimensions equal to the number of variables included in the data. This received data may be referred to herein as "observation data," and may take various forms. In example implementations, an asset—such as representative asset 106—may include a set of sensors and/or actuators that each serve to monitor a respective variable (e.g., a parameter) during the asset's operation and output a time-sequence of signal values for the monitored variable, where each value corresponds to a point of time the value was measured. For example, the sensors and/or actuators may monitor variables such as engine temperature, fluid levels, R.P.M., etc., among many other examples. As such, the asset's signal data may take the form of a time-sequence of multivariate data, where each respective data point in the sequence comprises a set of signal values measured by the asset's sensors and/or actuators at a respective point in time. (Additionally, the asset 106 and/or the asset data platform 102 may derive other variables from the asset's signal data, in which case these derived variables may also be included in the multivariate data). In practice, each different variable in the multivariate observation data may be thought of as a different dimension in an original coordinate space for the data points.

In one representative example, time-series, multivariate observation received by the asset data platform 102 may be thought of as a set of plots, each corresponding to an output of a respective sensor/actuator at a given asset. For instance, each observation variable may be viewed on a plot abscissa that represents time-series measurements of the variable by showing the sequence number of each measured value within the time sequence on a horizontal axis and the magnitude of each measured value on a vertical axis. In this sense, the observation data may also be represented as a matrix of measured values having a plurality of rows, each corresponding to a particular point of time, and a plurality of columns, each corresponding to a different variable. In line with the discussion above, each row in such a matrix may then be viewed as a respective data point (i.e., a respective set of signal value measurements) in an original coordinate space having a dimension for each column in the matrix (i.e., each variable in the multivariate data).

The asset data platform 102 may receive the aforementioned observation data in various manners, such as continuously (e.g., in "real time" or near real time), periodically, or in a "batch," among other possibilities. The way in which the asset data platform 102 receives data from an asset-related data source may depend on the type and/or configuration of the data source, among other factors. In any case, the asset data platform 102 may store the received data in a first database, such as a database affiliated with data storage 404, for use in performing anomaly detection.

After receiving the observation data at block 1102, the asset data platform 102 may also perform certain pre-processing functions on the observation data represented in the original coordinate space. For instance, in some embodiments, the asset data platform 102 may modify (or impute) certain values in the original coordinate space that do not comply with defined threshold values for the variables in the original coordinate space. In accordance with such embodiments and as described above, the asset data platform 102 may define one or more threshold values (e.g., minimum and/or maximum expected values) for each variable in the original coordinate space based on training data that is reflective of normal asset operation. In turn, the asset data platform 102 may be configured to compare the received observation data's values (either before or after pre-processing) to the defined threshold values for the variables in the original coordinate space, and then modify (or impute) any variable value that does not comply with defined threshold values. For example, the asset data platform 102 may replace any variable value that falls above or below a respective threshold value with the value of that threshold. The asset data platform 102 may modify the received observation data's values based on the comparison with the threshold values in other manners as well. For instance, if one or more of the received observation data's values is missing, or represented as 'not-a-number' or NaN, the asset data platform 102 may fill-in (or impute) the missing value with the mean or median value of the corresponding signal.

Typically, the observation data received at block 1102 and represented in the original coordinate space may contain values corresponding to correlated variables, which may render it difficult to detect anomalies. To facilitate highlighting the variability in the observation data the asset data platform 102 may utilize coordinate transformation techniques to produce uncorrelated variables from the correlated variables represented in the original coordinate space.

At block 1104, the asset data platform 102 may transform (or "project") the observation data from the original coordinate space to a transformed coordinate space having fewer dimensions than the original coordinate space, such as by employing dimensionality reducing techniques (e.g., PCA techniques) as described above with reference to block 604 of FIG. 6.

As a consequence of the reduced dimensionality of the original coordinate space relative to the transformed coordinate space, the transformed observation data points may each contain fewer variable values relative to the observed data points in the original coordinate space (e.g., fewer columns in the matrix).

At block 1106, the asset data platform 102 may standardize the transformed observation data in the transformed coordinate space in a manner similar to that discussed above with reference to block 606 of FIG. 6. That is, the asset data platform may perform z-score standardization on the transformed observation data so that the standardized transformed observation data is centered around the origin of the transformed coordinate space.

At block 1108, the asset data platform 102 may compare the standardized observation data with a set of threshold values that are defined based on training data that is reflective of normal asset operation. This set of threshold values may take various forms and be defined in various manners.

In a preferred embodiment, this set of threshold values may comprise a respective threshold value for each selected variable in the transformed coordinate space (e.g., each PC), where each variable's threshold value represents a maximum expected value of the variable during normal asset operation. However, the set of threshold values could take other forms as well. For instance, in some instances, the set of threshold values defined based on the training data may contain threshold values that correspond to less than all of the selected variables present in a given transformed coordinate space. In other instances, the threshold for given variable(s) in the transformed coordinate space may be associated with a measure of the transformed training data other than the maximum value. For example, the threshold may be associated with the 95th or 99th percentile of the distribution of the transformed training data. As another example, the threshold value may be set to some constant multiplied by the maximum value, such as 2 times or 1.5 times the maximum value of the transformed training data.

In one example, the set of thresholds may be viewed as multi-dimensional enclosed shape (e.g., a circle, ellipsoid, etc.) in the transformed coordinate space that is effectively defines a boundary centered around the transformed space's origin.

The asset data platform 102 may perform the comparison between the standardized transformed observation data and the set of threshold values in various manners. In a preferred embodiment, the asset data platform 102 may compare a given standardized observation data point's value for each respective variable in the transformed coordinate space (e.g., each PC) to the defined threshold value for that respective variable, to determine whether or not the data point's value exceeds the defined threshold value. However, the asset data platform 102 may perform the comparison in other manners as well.

At block 1110, the asset data platform 102 may modify the standardized observation data in the transformed coordinate space based on the comparison between the standardized observation data and the set of threshold values. For instance, if the asset data platform 102 determines based on the comparison that a standardized transformed observation data point comprises at least one variable value in the transformed coordinate space (e.g., a PC value) that exceeds a defined threshold value for that variable, the asset data platform 102 may modify the observation data point such that the at least one variable value no longer exceeds the defined threshold value. In other words, the asset data platform 102 may be configured to "shrink" one or more of the standardized observation data point's values so that the data point falls closer to (and perhaps within) the multi-dimensional enclosed shape bounded by the set of threshold values.

In one implementation, the asset data platform 102 may modify a standardized transformed observation data point on a variable-by-variable basis (e.g., a PC-by-PC basis), by replacing any variable value that exceeds the defined threshold value with the defined threshold value for that variable. For example, if a given data point comprises two variable values that exceed defined threshold values in the transformed coordinate space, the asset data platform 102 may replace the value of each such variable with the defined threshold value for that variable, thereby resulting in a reduction in magnitude of those two variable values. This implementation may be referred to as "component shrinkage."

Figure 12:
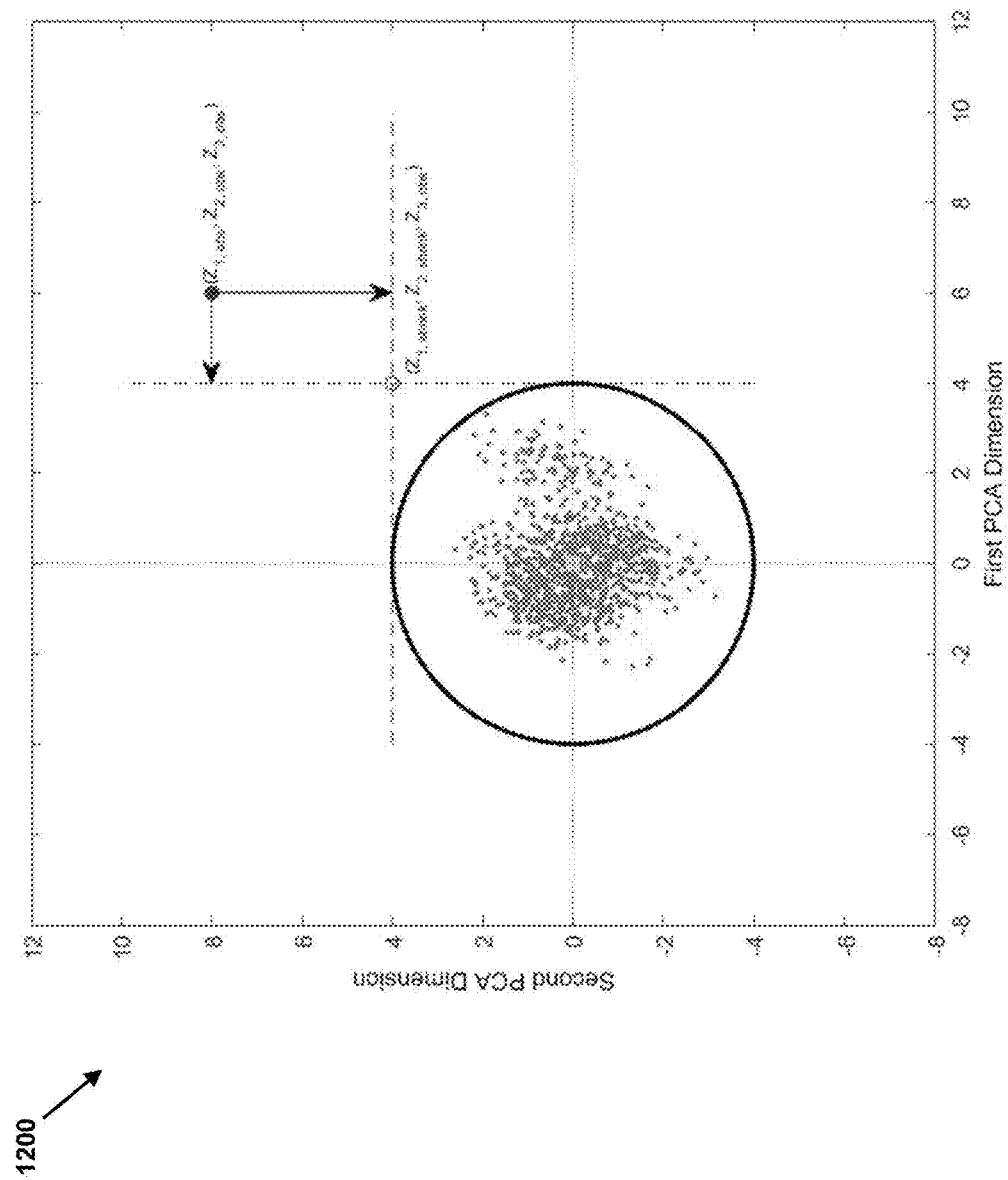
FIG. 12 depicts a conceptual illustration of a component shrinkage example.

FIG. 12 depicts a conceptual illustration of a component shrinkage example. As shown, an original observed data point may be comprised of values for three PCA variables shown as ($Z_{1,obs}$, $Z_{2,obs}$, $Z_{3,obs}$). Further, as shown, two of these values ($Z_{1,obs}$ and $Z_{2,obs}$) are outside the boundary defined the set of threshold values. Applying component shrinkage to this data point may involve replacing these two values with the threshold values for these variables, thereby resulting in a modified data point having values ($Z_{1,shrink}$, $Z_{2,shrink}$, $Z_{3,obs}$).

In another implementation, the asset data platform 102 may modify an observation data point in the transformed coordinate space by modifying a plurality of the data point's values in a coordinated manner. For example, if a given data point in the transformed coordinate space is determine to lay outside the multi-dimensional enclosed shape bounded by the set of threshold values in the transformed coordinate space, the asset data platform 102 may modify the given point's set of variable values in a manner such that the data point is effectively moved to the nearest point on the boundary. This implementation may be referred to as "vector shrinkage."

Figure 13:
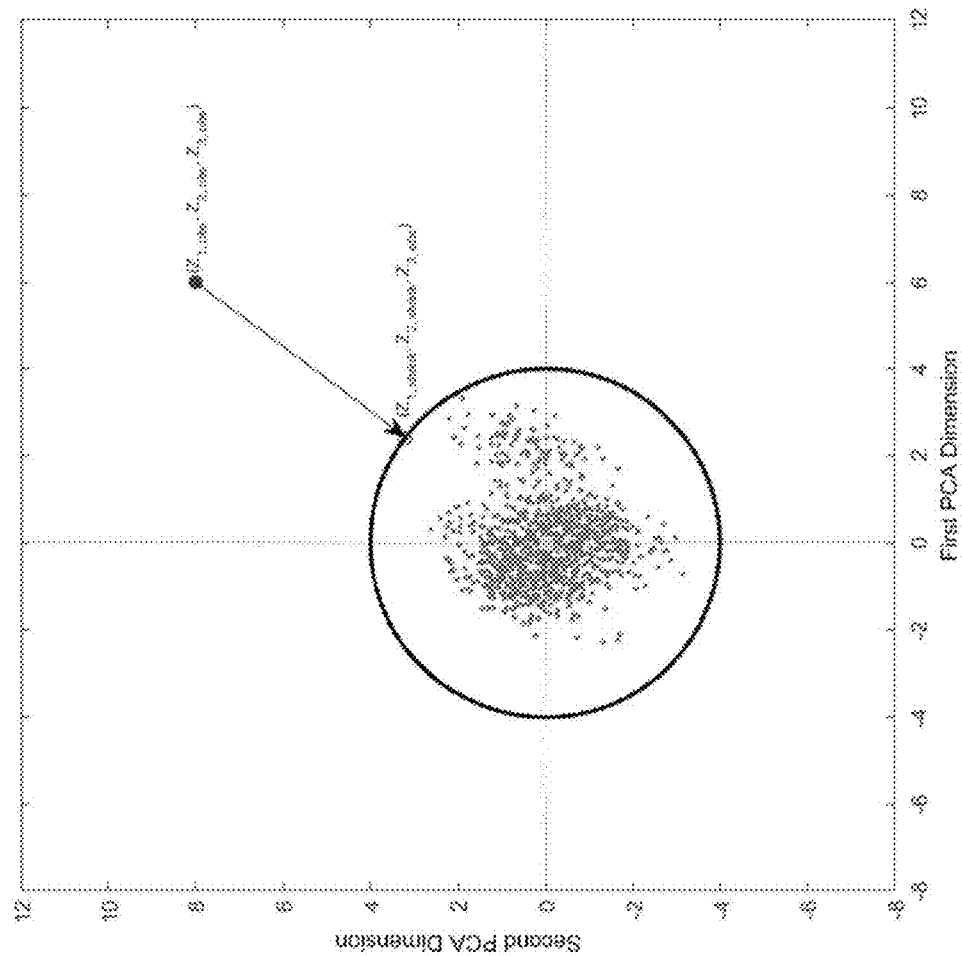
FIG. 13 depicts a conceptual illustration of a vector shrinkage example.

FIG. 13 depicts a conceptual illustration of a vector shrinkage example. As shown, an original observed data point may again be comprised of values for three PCA variables shown as ($Z_{1,obs}$, $Z_{2,obs}$, $Z_{3,obs}$). Further, as shown, two of these values ($Z_{1,obs}$ and $Z_{2,obs}$) are outside the boundary defined the set of threshold values. Applying vector shrinkage to this data point may involve identifying a coordinate space that is comprised of the PCA dimensions where the data point exceeds the boundary (the first and second PCA dimensions here), drawing a straight line in that space from the observed data point to the origin point, and then moving the data point to the location where this straight line intersects the boundary, thereby resulting in a modified data point having values ($Z_{1,shrink}$, $Z_{2,shrink}$, $Z_{3,obs}$). In this example, as shown, the values for $Z_{1,shrink}$ and $Z_{2,shrink}$ may be smaller than the threshold values.

The asset data platform 102 may modify an observation data point in the transformed coordinate space in other manners as well.

In preferred embodiments, the asset data platform 102 will be configured to modify the observation data in the transformation coordinate space at block 1110 regardless of whether or not the asset data platform 102 is configured to modify (or impute) the observation data in the original coordinate space during pre-processing. However, in some alternative embodiments, an asset data platform 102 configured to modify the observation data in the original coordinate space during pre-processing may then skip block 1110 such that it would not also modify the observation data in the transformed coordinate space. In other words, the asset data platform 102 may be configured to implement the original coordinate space modification and the transformation coordinate space modification in any combination.

At block 1112, the asset data platform 102 may inversely transform (or project) the modified observation data from the transformed coordinate space back to the original coordinate space. In practice, an observation data point that was modified in the transformed coordinate space and then projected back out to the original coordinate space in the above mentioned manner may have at least one variable value that meaningfully differs from the received observation data in the original coordinate space. That is, a "gap"

may exist between the pre-transformation observation data point and the post-transformation observation point in at least one dimension of the original coordinate space that may indicative of an anomaly.

After inversely transforming the modified observation data, the asset data platform 102 may, in some instances, also perform certain post-processing functions on the observation data. For example, the asset data platform 102 may "un-normalize" the inversely transformed data in order effectively compare such data to the initially received observation data. The asset data platform 102 may perform various other post-processing functions.

At block 1114, the asset data platform 102 may analyze the post-transformation observation data in the original coordinate space to identify anomalies. For example, the asset data platform 102 may apply anomaly detection tests to analyze how the post-transformation observation data (e.g., inversely transformed modified observation data) compares to the pre-transformation observation data (e.g., received observation data) in the original coordinate space over a predefined period of time, in order to identify instances when one or more variables in the observation data appear to be anomalous (e.g., instances when statistically-significant discrepancies exist in at least one variable value between the post-transformation and pre-transformation observation data).

Furthermore, the asset data platform 102 may utilize diagnostic and prognostic methods that analyze received observation data, transformed observation data, and anomaly detection test results to determine whether the anomalous behavior is indicative of equipment failure. Such diagnostic and prognostic methods include, but are not limited to, time series extrapolation, expert rules, and machine learning techniques.

In turn, the asset data platform 102 may perform various functions based on this identification. As one example, the asset data platform 102 may generate notifications of identified anomalies, which may be visually and/or audibly presented to a user, such as at representative client station 112. As another example, the asset data platform 102 may be configured to discard asset data in which anomalies are identified, such that this potentially-unreliable data is not used by the asset data platform 102 for other purposes (e.g., to present to a user, train or execute a model, etc.). The asset data platform 102 may perform other functions based on its identification of anomalies as well.

While the techniques disclosed herein have been discussed in the context of an asset data platform detecting anomalies in asset-related data, it should also be understood that the disclosed concepts may be used to detect anomalies in various other contexts as well.

V. Conclusion

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing device comprising:
   a network interface;
   at least one processor;
   a non-transitory computer-readable medium; and
   program instructions stored on the non-transitory computer-readable medium that, when executed by the at least one processor, cause a computing device to:
   receive, via the network interface, multivariate data in an original coordinate space having a number of dimensions equal to the number of variables included in the multivariate data, wherein the multivariate data relates to operation of an asset;
   transform the received multivariate data from the original coordinate space to a transformed coordinate space having fewer dimensions than the original coordinate space;
   standardize the data in the transformed coordinate space;
   modify the standardized data in the transformed coordinate space based on a set of threshold values, wherein the set of threshold values are defined based on training data reflective of normal asset operation;
   inversely transform the modified data from the transformed coordinate space to the original coordinate space; and
   analyze the inversely-transformed data in the original coordinate space to identify anomalies in the multivariate data that are indicative of a potential problem at the asset.

2. The computing device of claim 1, wherein the program instructions that are executable to cause the computing device to transform the received multivariate data from the original coordinate space to the transformed coordinate space having fewer dimensions than the original coordinate space comprise program instructions that are executable to cause a computing device to:
   apply Principal Component Analysis (PCA) to the received multivariate data in the original coordinate space, wherein the application of PCA comprises:
   identifying a set of Principal Components that describe the variability in the received multivariate data;
   based on the set of Principal Components, linearly transforming the received multivariate data in the original coordinate space to the transformed coordinate space, wherein each dimension of the transformed coordinate space corresponds to a Principal Component belonging to the set of Principal Components.

3. The computing device of claim 1, wherein the program instructions that are executable to cause the computing to analyze the inversely-transformed data in the original coordinate space to identify anomalies in the multivariate data that are indicative of a potential problem at the asset comprise program instructions that are executable to cause the computing device to:
   compare the received multivariate data and the inversely-transformed data in the original coordinate space; and
   identify statistically-significant discrepancies in at least one variable value between the received multivariate data and the inversely-transformed data.

4. The computing device of claim 1, wherein the program instructions that are executable to cause the computing device to standardize the data in the transformed coordinate space comprise program instructions that are executable to cause the computing device to:
   rescale the data in the transformed coordinate space, wherein the rescaled data is centered around an origin of the transformed coordinate space and adheres to a standard normal distribution.

5. The computing device of claim 1, wherein the program instructions that are executable to cause a computing device to modify the standardized data in the transformed coordinate space based on the set of threshold values comprise program instruction that are executable to cause the computing device to:
  compare a given standardized data point's value for each dimension in the transformed coordinate space to a defined threshold value for that dimension; and
  determine whether one or more of the standardized data point's values exceed the defined threshold value for that variable.

6. The computing device of claim 1, wherein the program instructions that are executable to cause the computing device to modify the standardized data in the transformed coordinate space based on the set of threshold values comprise program instruction that are executable to cause the computing device to:
  identify a standardized data point in the transformed coordinate space having a value in at least one given dimension that exceeds a defined threshold value for the given dimension;
  reduce the magnitude of the value in at least the given dimension to be equal to the defined threshold value for the given dimension.

7. The computing device of claim 6, wherein the program instructions that are executable to cause the computing device to reduce the magnitude of the value in at least the given dimension to be equal to the defined threshold value for the given dimension comprise program instruction that are executable to cause the computing device to:
  reduce the magnitude of the value in at least the given dimension using at least one of vector shrinkage or component shrinkage.

8. A non-transitory computer-readable medium having program instructions stored thereon that are executable to cause a computing system to:
  receive multivariate data in an original coordinate space having a number of dimensions equal to the number of variables included in the multivariate data, wherein the multivariate data relates to operation of an asset;
  transform the received multivariate data from the original coordinate space to a transformed coordinate space having fewer dimensions than the original coordinate space;
  standardize the data in the transformed coordinate space;
  modify the standardized data in the transformed coordinate space based on a set of threshold values, wherein the set of threshold values are defined based on training data reflective of normal asset operation;
  inversely transform the modified data from the transformed coordinate space to the original coordinate space; and
  analyze the inversely-transformed data in the original coordinate space to identify anomalies in the multivariate data that are indicative of a potential problem at the asset.

9. The non-transitory computer-readable medium of claim 8, wherein the program instructions that are executable to cause the computing system to transform the received multivariate data from the original coordinate space to the transformed coordinate space having fewer dimensions than the original coordinate space comprise program instructions that are executable to cause a computing device to:
  apply Principal Component Analysis (PCA) to the received multivariate data in the original coordinate space, wherein the application of PCA comprises:
    identifying a set of Principal Components that describe the variability in the received multivariate data;
    based on the set of Principal Components, linearly transforming the received multivariate data in the original coordinate space to the transformed coordinate space, wherein each dimension of the transformed coordinate space corresponds to a Principal Component belonging to the set of Principal Components.

10. The non-transitory computer-readable medium of claim 8, wherein the program instructions that are executable to cause the computing system to analyze the inversely-transformed data in the original coordinate space to identify anomalies in the multivariate data that are indicative of a potential problem at the asset comprise program instructions that are executable to cause the computing device to:
  compare the received multivariate data and the inversely-transformed data in the original coordinate space; and
  identify statistically-significant discrepancies in at least one variable value between the received multivariate data and the inversely-transformed data.

11. The non-transitory computer-readable medium of claim 8, wherein the program instructions that are executable to cause the computing system to standardize the data in the transformed coordinate space comprise program instructions that are executable to cause the computing device to:
  rescale the data in the transformed coordinate space, wherein the rescaled data is centered around an origin of the transformed coordinate space and adheres to a standard normal distribution.

12. The non-transitory computer-readable medium of claim 8, wherein the program instructions that are executable to cause the computing system to modify the standardized data in the transformed coordinate space based on the set of threshold values comprises program instruction that are executable to cause the computing device to:
  compare a given standardized data point's value for each dimension in the transformed coordinate space to a defined threshold value for that dimension; and
  determine whether one or more of the standardized data point's values exceed the defined threshold value for that variable.

13. The non-transitory computer-readable medium of claim 8, wherein the program instructions that are executable to cause the computing system to modify the standardized data in the transformed coordinate space based on the set of threshold values comprises program instruction that are executable to cause the computing device to:
  identify a standardized data point in the transformed coordinate space having a value in at least one given dimension that exceeds a defined threshold value for the given dimension;
  reduce the magnitude of the value in at least the given dimension to be equal to the defined threshold value for the given dimension.

14. The non-transitory computer-readable medium of claim 13, wherein the program instructions that are executable to cause the computing system to reduce the magnitude of the value in at least the given dimension to be equal to the defined threshold value for the given dimension comprise program instruction that are executable to cause the computing system to:
  reduce the magnitude of the value in at least the given dimension using at least one of vector shrinkage or component shrinkage.

15. A computer-implemented method, the method comprising
- receiving multivariate data in an original coordinate space having a number of dimensions equal to the number of variables included in the multivariate data, wherein the multivariate data relates to operation of an asset;
- transforming the received multivariate data from the original coordinate space to a transformed coordinate space having fewer dimensions than the original coordinate space;
- standardizing the data in the transformed coordinate space;
- modifying the standardized data in the transformed coordinate space based on a set of threshold values, wherein the set of threshold values are defined based on training data reflective of normal asset operation;
- inversely transforming the modified data from the transformed coordinate space to the original coordinate space; and
- analyzing the inversely-transformed data in the original coordinate space to identify anomalies in the multivariate data that are indicative of a potential problem at the asset.

16. The computer-implemented method of claim 15, wherein transforming the received multivariate data from the original coordinate space to the transformed coordinate space having fewer dimensions than the original coordinate space comprises:
- applying Principal Component Analysis (PCA) to the received multivariate data in the original coordinate space, wherein the application of PCA comprises:
  - identifying a set of Principal Components that describe the variability in the received multivariate data;
  - based on the set of Principal Components, linearly transforming the received multivariate data in the original coordinate space to the transformed coordinate space, wherein each dimension of the transformed coordinate space corresponds to a Principal Component belonging to the set of Principal Components.

17. The computer-implemented method of claim 15, wherein analyzing the inversely-transformed data in the original coordinate space to identify anomalies in the multivariate data that are indicative of a potential problem at the asset comprises:
- comparing the received multivariate data and the inversely-transformed data in the original coordinate space; and
- identifying statistically-significant discrepancies in at least one variable value between the received multivariate data and the inversely-transformed data.

18. The computer-implemented method of claim 15, wherein standardizing the data in the transformed coordinate space comprises:
- rescaling the data in the transformed coordinate space, wherein the rescaled data is centered around an origin of the transformed coordinate space and adheres to a standard normal distribution.

19. The computer-implemented method of claim 15, wherein modifying the standardized data in the transformed coordinate space based on the set of threshold values comprises:
- comparing a given standardized data point's value for each dimension in the transformed coordinate space to a defined threshold value for that dimension; and
- determining whether one or more of the standardized data point's values exceed the defined threshold value for that variable.

20. The computer-implemented method of claim 15, wherein modifying the standardized data in the transformed coordinate space based on the set of threshold values comprises:
- identifying a standardized data point in the transformed coordinate space having a value in at least one given dimension that exceeds a defined threshold value for the given dimension;
- reducing the magnitude of the value in at least the given dimension to be equal to the defined threshold value for the given dimension.

* * * * *